(12) United States Patent
Shimy et al.

(10) Patent No.: US 11,252,480 B2
(45) Date of Patent: Feb. 15, 2022

(54) SYSTEMS AND METHODS FOR AUTOMATICALLY DETECTING USERS WITHIN DETECTION REGIONS OF MEDIA DEVICES

(71) Applicant: Rovi Guides, Inc., San Jose, CA (US)

(72) Inventors: Camron Shimy, Canyon Country, CA (US); Benjamin Kim, Los Angeles, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 16/817,767

(22) Filed: Mar. 13, 2020

(65) Prior Publication Data

US 2020/0221188 A1 Jul. 9, 2020

Related U.S. Application Data

(63) Continuation of application No. 16/510,514, filed on Jul. 12, 2019, now Pat. No. 10,631,066, which is a
(Continued)

(51) Int. Cl.
*H04N 21/81* (2011.01)
*G11B 27/10* (2006.01)
(Continued)

(52) U.S. Cl.
CPC ......... *H04N 21/812* (2013.01); *G11B 27/105* (2013.01); *H04N 21/42201* (2013.01);
(Continued)

(58) Field of Classification Search
CPC .......... H04N 21/812; H04N 21/42201; H04N 21/44218; H04N 21/4438; H04N 21/4532;
(Continued)

(56) References Cited

U.S. PATENT DOCUMENTS 5,353,121 A 10/1994 Young et al.
5,559,550 A 9/1996 Mankovitz
(Continued)

FOREIGN PATENT DOCUMENTS

JP 2005167712 A 6/2005
JP 2005531239 A 10/2005
(Continued)

*Primary Examiner* — Sunghyoun Park
(74) *Attorney, Agent, or Firm* — Haley Guiliano LLP

(57) ABSTRACT

Systems and methods are presented for detecting users within a range of a media device. A detection region may be defined that is within the range of the media device and smaller than the range. The detection region may be stored. It may be determined whether a user is within the detection region. The media device may be activated and settings associated with the user may be applied when a user is within the detection region. In some embodiments, settings associated with a user may be compared to provided media content when the user is within the detection region. The content may change when the settings conflict with the media content. Reminders may be provided to or directed to a plurality of users within the range of the media device.

20 Claims, 19 Drawing Sheets

Related U.S. Application Data continuation of application No. 16/117,981, filed on Aug. 30, 2018, now Pat. No. 10,362,367, which is a continuation of application No. 14/662,035, filed on Mar. 18, 2015, now Pat. No. 10,085,072, which is a continuation of application No. 12/565,486, filed on Sep. 23, 2009, now Pat. No. 9,014,546.

(51) Int. Cl.
| | | |
|---|---|---|
| *H04N 21/422* | (2011.01) | |
| *H04N 21/442* | (2011.01) | |
| *H04N 21/443* | (2011.01) | |
| *H04N 21/45* | (2011.01) | |
| *H04N 21/475* | (2011.01) | |
| *H04N 21/478* | (2011.01) | |
| *H04N 21/482* | (2011.01) | |
| *H04N 21/47* | (2011.01) | |

(52) U.S. Cl.
CPC ... *H04N 21/4438* (2013.01); *H04N 21/44218* (2013.01); *H04N 21/4532* (2013.01); *H04N 21/47* (2013.01); *H04N 21/478* (2013.01); *H04N 21/4755* (2013.01); *H04N 21/4826* (2013.01)

(58) Field of Classification Search
CPC .. H04N 21/47; H04N 21/4755; H04N 21/478; H04N 21/4826; G11B 27/105
See application file for complete search history.

(56) References Cited

U.S. PATENT DOCUMENTS

| | | | |
|---|---|---|---|
| 5,583,560 A | 12/1996 | Florin et al. | |
| 5,850,218 A | 12/1998 | Lajoie et al. | |
| 5,973,682 A | 10/1999 | Saib et al. | |
| 6,021,432 A | 2/2000 | Sizer et al. | |
| 6,028,599 A | 2/2000 | Yuen et al. | |
| 6,177,931 B1 | 1/2001 | Alexander et al. | |
| 6,546,002 B1 | 4/2003 | Kim | |
| 7,768,388 B2 | 8/2010 | Putterman et al. | |
| 9,448,685 B1 | 9/2016 | Somin et al. | |
| 2001/0006382 A1 | 7/2001 | Sevat | |
| 2001/0039656 A1 | 11/2001 | Nakamura et al. | |
| 2002/0092032 A1 | 7/2002 | Kim | |
| 2002/0114611 A1 | 8/2002 | Gu et al. | |
| 2002/0116471 A1 | 8/2002 | Shteyn | |
| 2002/0144007 A1 | 10/2002 | Shteyn | |
| 2002/0194586 A1* | 12/2002 | Gutta | H04N 21/4223 725/10 |
| 2003/0154484 A1 | 8/2003 | Plourde et al. | |
| 2003/0181198 A1 | 9/2003 | Sato et al. | |
| 2004/0017513 A1 | 1/2004 | Takahashi | |
| 2004/0061716 A1 | 4/2004 | Cheung et al. | |
| 2004/0158855 A1 | 8/2004 | Gu et al. | |
| 2004/0264916 A1 | 12/2004 | Van et al. | |
| 2005/0021810 A1 | 1/2005 | Umemura et al. | |
| 2005/0028209 A1 | 2/2005 | Sinisalo | |
| 2005/0036509 A1 | 2/2005 | Acharya et al. | |
| 2005/0055716 A1 | 3/2005 | Louie et al. | |
| 2005/0064860 A1 | 3/2005 | Deline | |
| 2005/0144635 A1 | 6/2005 | Boortz | |
| 2005/0251827 A1 | 11/2005 | Ellis et al. | |
| 2005/0258806 A1 | 11/2005 | Janik et al. | |
| 2006/0077310 A1 | 4/2006 | Wang et al. | |
| 2006/0140584 A1 | 6/2006 | Ellis et al. | |
| 2006/0263048 A1 | 11/2006 | Sato et al. | |
| 2006/0289637 A1* | 12/2006 | Brice | B62B 3/1428 235/385 |
| 2007/0067808 A1 | 3/2007 | Dacosta | |
| 2007/0078905 A1 | 4/2007 | Gunther et al. | |
| 2007/0121584 A1 | 5/2007 | Qiu et al. | |
| 2007/0130592 A1 | 6/2007 | Haeusel | |
| 2007/0130626 A1 | 6/2007 | Kato et al. | |
| 2007/0243907 A1 | 10/2007 | Jin et al. | |
| 2007/0294632 A1 | 12/2007 | Toyama et al. | |
| 2008/0062318 A1 | 3/2008 | Ellis et al. | |
| 2008/0108386 A1 | 5/2008 | Hard | |
| 2008/0114694 A1 | 5/2008 | Hamdane et al. | |
| 2008/0181377 A1 | 7/2008 | Qiu et al. | |
| 2008/0201731 A1* | 8/2008 | Howcroft | H04L 63/0815 725/13 |
| 2008/0201751 A1 | 8/2008 | Ahmed et al. | |
| 2008/0281926 A1 | 11/2008 | Walter et al. | |
| 2009/0158361 A1 | 6/2009 | Tsusaka et al. | |

FOREIGN PATENT DOCUMENTS

| | | |
|---|---|---|
| JP | 2008262398 A | 10/2008 |
| JP | 2008294909 A | 12/2008 |
| JP | 2009065305 A | 3/2009 |

* cited by examiner

SYSTEMS AND METHODS FOR AUTOMATICALLY DETECTING USERS WITHIN DETECTION REGIONS OF MEDIA DEVICES

CROSS-REFERENCE TO RELATED APPLICATIONS

This application is a continuation of U.S. patent application Ser. No. 16/510,514, filed Jul. 12, 2019, which is a continuation of U.S. patent application Ser. No. 16/117,981, filed Aug. 30, 2018, now U.S. Pat. No. 10,362,367, which is a continuation of U.S. patent application Ser. No. 14/662,035, filed Mar. 18, 2015, now U.S. Pat. No. 10,085,072, which is a continuation of U.S. patent application Ser. No. 12/565,486, filed Sep. 23, 2009, now U.S. Pat. No. 9,014,546, the disclosures of which are hereby incorporated by reference herein in their entireties.

BACKGROUND OF THE INVENTION

This application relates to interactive media guidance applications and more particularly to automatic detection and identification of users near media devices.

Traditional systems allow a user to manually log into media devices to allow access to the user's profile. In many cases, however, users may not log in due to the inconvenience of affirmatively logging into the media device. Furthermore, traditional systems generally only allow one user to be logged into a device at any given time. When multiple users are accessing content on a media device, the content may be tailored to at most one user, for example, the one user who affirmatively logged into the device. Therefore, traditional systems are ineffective at targeting and tailoring content to users in many situations.

SUMMARY OF THE INVENTION

In view of the foregoing, it would be desirable to provide systems and methods for allowing users to be detected and identified by a media device automatically. In particular, it would be desirable to provide a system that automatically logs a user into the media device when the user is identified by the device so that the device may more effectively tailor content to that user. It may also be desirable to allow the user to move from one device to another device and continue seamlessly accessing content at each of the devices without requiring the user to affirmatively login into the devices and/or select content to access on the devices. Seamless access of content may allow a user to continue accessing content across multiple devices and/or times substantially automatically (e.g., requires little to no manual input and/or action on the part of the user) and/or with substantially no discontinuity. It may also be desirable to automatically detect and identify multiple users at a media device so that content may be more effectively tailored to all users that are simultaneously utilizing a media device.

A media device having a detection mechanism may be provided. The detection mechanism is operable to detect a first user within a range relative to the media device. A detection region that is within the range may be defined. It may be determined whether the first user is within the detection region. Upon detecting a first user within the detection region, the media device may be activated. First settings associated with the first user may be applied when the first user is within the detection region. Content may be provided that is based on the first settings associated with the first user. When the first user is outside the detection region, but still within the range, the application of the first settings may be stopped.

A second user may be determined to be within the detection region. Second settings associated with the second user may be applied to the media device. In some embodiments, the settings associated with the first user and second user may be combined to create third settings. Media content may be provided based on the third settings. The media content may be, for example, advertisements that are targeted to the combination of the first and second users using the third settings.

In some embodiments, it may be determined that the first user is no longer within the detection region. The third settings may be modified so that it is based only on settings associated with users who remain within detection regions within the first detectable range. Another media content may be provided based on the modified third settings.

In some embodiments, it may be determined that the first user returned within a detection region of the media device. The media content may be changed back to original media content that was provided before the first user left the media device and may be provided from a point in the original media content where it was determined that the first user was no longer within the detection region.

In some embodiments, it may be determined that the first user went to another media device after leaving the detection region of the original media device. For example, the first user may be determined to be within a second detection region, wherein the second detection region is within a range relative to a second media device. The media content that was provided on the original media device may be continued on the new media device. In some embodiments, the activities of the first user may be communicated back to the original media device.

In some embodiments, boundaries of detection regions associated with multiple devices may be configured. For example, two devices may be associated with detectable ranges that overlap. The overlapping of the ranges may be determined by the media devices. Detection regions associated with the respective devices may be set such that the boundaries of the regions remain within the detectable range of the respective device without protruding into the detectable range of the other device.

In some embodiments, media content that is provided on a media device may be changed when properties of the media content conflict with settings that are associated with a user. The media device may be provided with a detection mechanism that is operable to detect a user within a range relative to the media device. A detection region associated with the media device may be set. A first media content may be provided to the first user who is within the first detection region. A second user may be detected within the range relative to the media device. Second settings that are associated with the second user may be compared with properties of the first media content. The first media content may be changed when the second setting conflict with the properties of the first media content. Otherwise, the second user may be added to a list of active users at the media device when the second user is within the first detection region.

In some embodiments, reminders may be provided to one or more of the users within a range of a media device. For example, the media device may detect a plurality of uses within a detection region that is associated with the media device. The plurality of users are logged into the media device and considered active users when they are detected within the detection region. A first media content may be provided to the active users. A reminder that is associated with a first and second user of the plurality of users may be provided to remind the active users of a second media content. The reminder may provide an indication whether some or all of the plurality users would probably like or dislike the reminded content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
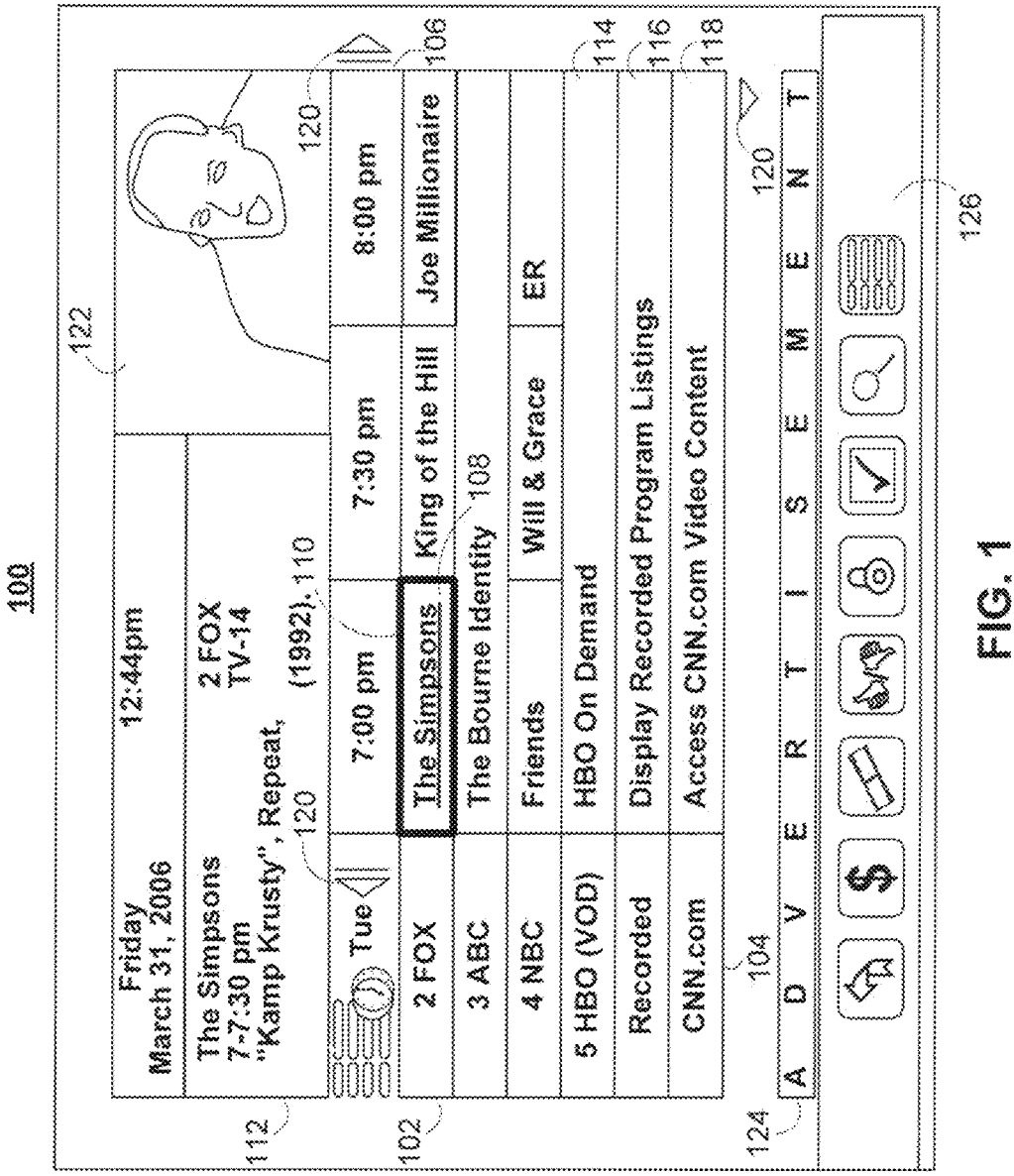
FIGS. 1 and 2 show illustrative display screens that may be used to provide media guidance application listings in accordance with an embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia, and/or any other suitable type of media and/or content.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as online applications (i.e., provided on a website), or as stand-alone applications or clients on hand-held computers, PDAs, mobile telephones, or other mobile devices. These devices and/or any other suitable devices capable of presenting images, text, audio content, video content, or any combination thereof may be referred to as a media device herein. The various devices and platforms that may implement media guidance applications are described in more detail below.

Figure 2:
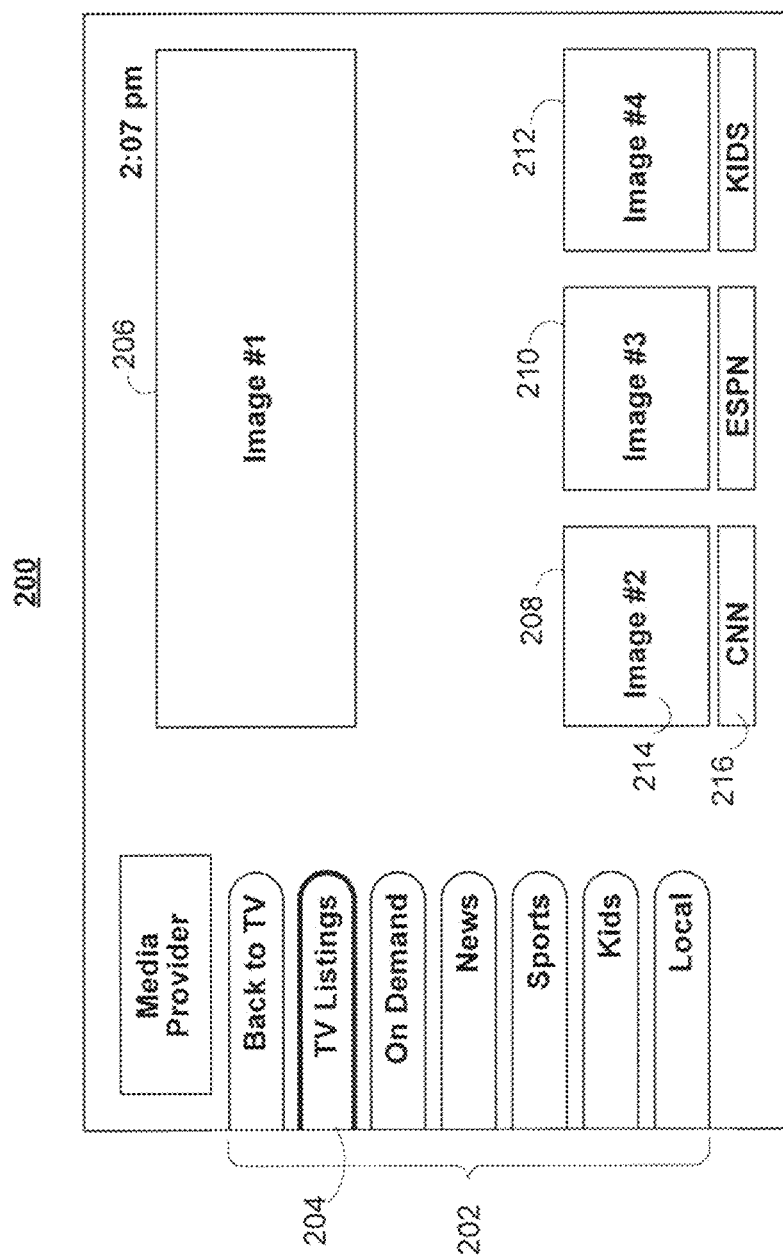

One of the functions of the media guidance application is to provide media listings and media information to users. FIGS. 1-2 show illustrative display screens that may be used to provide media guidance, and in particular media listings. The display screens shown in FIGS. 1-2 and 5-14 may be implemented on any suitable device or platform. While the displays of FIGS. 1-2 and 5-14 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming and/or access to a device), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003-0110499, published Jun. 12, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, multiple-user use and access configuration options, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. For example, a user may be identified by way of biometrics (e.g., heat signature, voice signature), or a mobile device that may be within a predetermined detection region of a media device. After identification is made, the identified user may be logged into the media device and gain access to the user's personalized guidance application. Such embodiments are discussed further below with regard to FIGS. 5-20.

Customization of the media guidance application, and/or media devices may be made in accordance with a user profile and/or user profiles. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, how users may be identified, what action or actions a media device may perform once a user is detected and/or identified, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. Patent Application Publication No. 2005-0251827, published Nov. 10, 2005, Boyer et al., U.S. Pat. No. 7,165,098, issued Jan. 16, 2007, and Ellis et al., U.S. Patent Application Publication No. 2002-0174430, published Nov. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
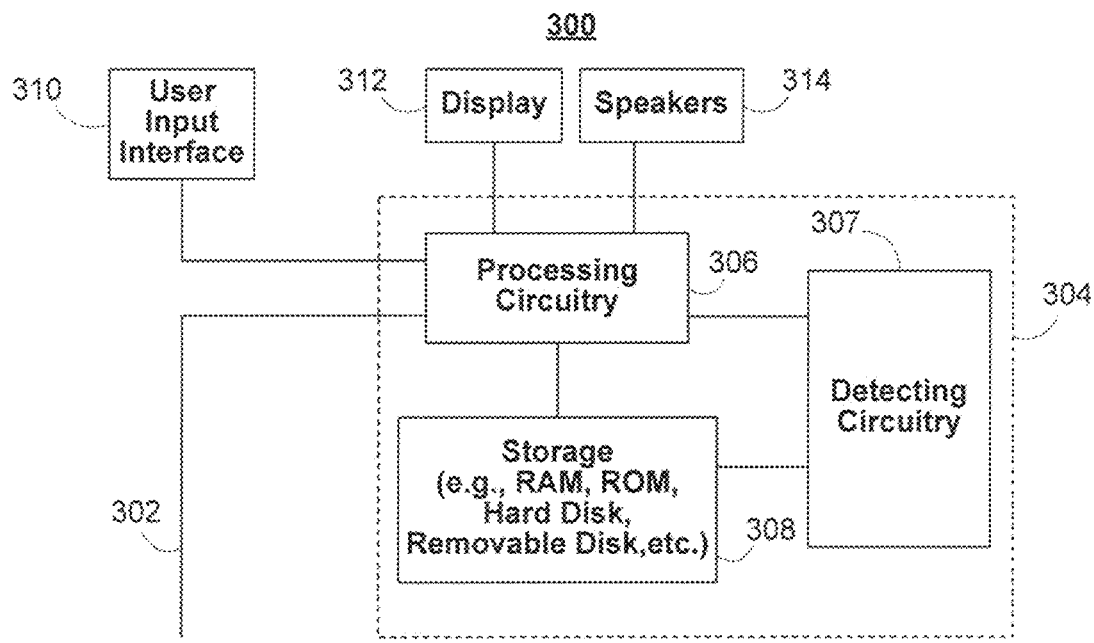
FIG. 3 shows an illustrative media device in accordance with another embodiment of the invention.

Users may access media content and the media guidance application (and its display screens described above and below) from one or more of their media devices. FIG. 3 shows a generalized embodiment of illustrative media device 300. More specific implementations of media devices are discussed below in connection with FIG. 4. Media device 300 may receive media content and data via input/output (hereinafter "I/O") path 302. I/O path 302 may provide media content (e.g., broadcast programming, on-demand programming, Internet content, and other video or audio) and data to control circuitry 304, which may include processing circuitry 306, detecting circuitry 307, and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of media devices, or communication of media devices in locations remote from each other (described in more detail below).

In some embodiments, control circuitry 304 may include detecting circuitry 307 which may be capable of detecting and/or identifying a user or users without requiring the user or users to make any affirmative actions by using any suitable biometric recognition technique, such as, facial recognition, heat signature recognition, odor recognition, scent recognition, body shape recognition, voice recognition, behavioral recognition, or any other suitable biometric recognition technique. For example, detecting circuitry 307 may detect and identify users using these techniques while the users are beyond a tangible distance to a media device. In some embodiments, users may be detecting and/or identified using any other suitable biometric recognition technique that may in some embodiments require the users to be within a tangible distance to a media device, for example, iris recognition, retinal recognition, palm recognition, finger print recognition, or any other suitable technique.

Detecting circuitry 307 may also be capable of detecting and/or identifying a user or users based on recognition and/or identification of a media device (e.g., a mobile device, such as an RFID device or mobile phone) that may be associated with the user or users. Detecting circuitry 307 may recognize and identify such a device using any suitable means, for example, radio-frequency identification, Bluetooth, Wi-Fi, WiMax, internet protocol, infrared signals, any other suitable IEEE, industrial, or proprietary communication standards, or any other suitable electronic, optical, or auditory communication means. For example, detecting circuitry 307 may determine that a user is within a predetermined detection region of a media device, identify the user, and add the user to a list of active users at the media device. The detection and identification of users as described herein does not require any affirmative action on the part of the user beyond, in some embodiments, the configuration of such methods and systems. For example, any detection and identification of users is done automatically by media devices.

Detecting circuitry 307 may include any suitable hardware and/or software to perform detection and identification operations. For example, detecting circuitry 307 may include infrared, optical, and/or radio-frequency receivers and/or transmitters. Detecting circuitry 307 may additionally, or alternatively, include one or more microphone and/or camera to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information. Detecting circuitry 307 may additionally, or alternatively, include palm, fingerprint, and/or retinal readers for detecting and/or identifying users. In some embodiments, detecting circuitry may communicate to processing circuitry 306 and/or storage 308 various detection and/or identification mechanisms indicating whether a user is detected and/or identified at a particular device.

In some embodiments, detecting circuitry 307 may use any suitable method to determine the distance, trajectory, and/or location a user is in relation to a media device. For example, a media device may use received signal strength indication (RSSI) from a user's mobile device to determine the distance the user is to the media device. For example, RSSI values may be triangulated to determine a user's location. The media device may also use, for example, triangulation and/or time difference of arrival determination of appropriate information to determine a user's location in relation to a media device. For example, time difference of arrival values of sounds emanating from a user may be determined. In some embodiments, any suitable image processing, video processing, and/or computer vision technique may be used to determine a user's distance, trajectory, and/or location in relation to a media device. A user's distance, trajectory, and/or location in relation to a media device may be determined using any suitable method.

Herein, an identified user may refer to a user who may be recognized sufficiently by a device to associate the user with a user profile. In some embodiments, the user may be associated with a group of users, as opposed to, or in addition to being associated with a unique user profile. For example, the user may be associated with the user's family, friends, age group, sex, and/or any other suitable group. A detected user may refer to a user whose presence is detected by a device, but who is not yet identified by the device. Such embodiments are discussed in further detail with regard to FIGS. 5-20.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, media device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, a list of active users at a media device, a list of past users at a media device, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of media device 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from media device 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces, or combination of user input interfaces. User input interface 310 may communicate with one or more media device. In some embodiments, user input interface 310 may be a remote control with pressure-sensitive buttons. Control circuitry 304 may recognize different amounts of pressure applied to the pressure-sensitive buttons and adjust navigation through, for example, the guidance application. For example, the amount of pressure applied may adjust the speed of scrolling through guidance application listings, such that when less pressure is applied, the listings scroll slower and when more pressure is applied, the listings scroll faster. The pressure-sensitive buttons may control any portion of the guidance application or a media device in any suitable manner.

In some embodiments, user input interface 310 may be incorporated into a mobile device, such as a mobile phone. In such embodiments, user input interface 310 may obtain appropriate commands, information, and/or updates associated with a user or media device, or any other suitable information via the cellular phone network.

In some embodiments, user input interface 310 may communicate with media devices using any suitable means, for example, radio-frequency identification, Bluetooth, Wi-Fi, WiMax, internet protocol, infrared signals, any other suitable IEEE, industrial, or proprietary communication standards, or any other suitable electronic optical, or auditory communication means. For example, user input interface 310 that may be incorporated into a user's mobile phone may communicate with media devices using Wi-Fi. In some embodiments, user input interface 310 may communicate with an intermediate device that may convert any suitable communication means to any other suitable communication means. For example, a user may attempt to scroll through a guidance application using the user's mobile phone incorporated with user input interface 310. User input interface 310 may output Wi-Fi packets to communicate with user's scroll instructions. An intermediate device may receive the Wi-Fi packets and in turn transmit infrared packets to control circuitry 304.

In some embodiments, user input interface 310 may store, transmit, and/or receive information associated with and/or identifying a particular user or users. This information may be used by detecting circuitry 307 to detect and/or identify that the user associated with the information is within a predetermined detection region of a media device. The user may then be added to a list of active users at the media device and/or logged into the media device. Such embodiments are discussed in further detail below with regard to FIGS. 5-20.

Display 312 may be provided as a stand-alone device or integrated with other elements of media device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of media device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on media device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on media device 300 is retrieved on-demand by issuing requests to a server remote to the media device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
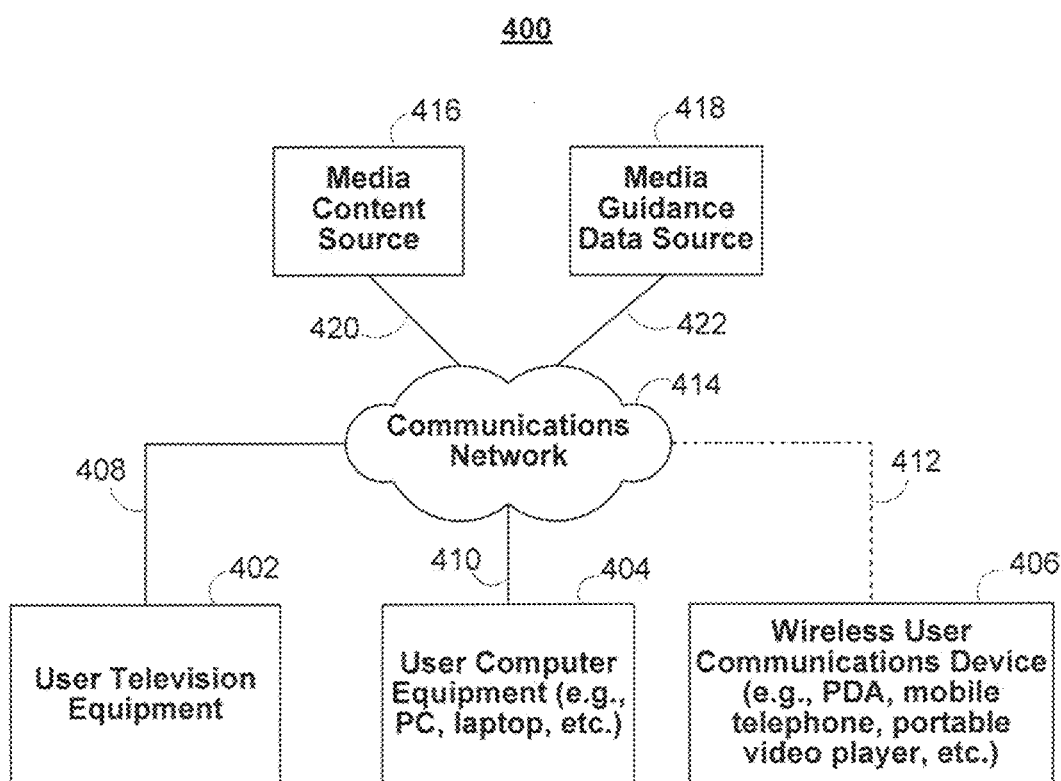
FIG. 4 is a diagram of an illustrative cross-platform interactive media system in accordance with another embodiment of the invention.

Media device 300 of FIG. 3 may be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment, user equipment devices, or media devices. Media devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of media device but only one of each is shown in FIG. 4 to avoid overcomplicating the drawing. In addition, each user may utilize more than one type of user equipment device (e.g., a user may have a television set and a computer) and also more than one of each type of media device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, multiple-user use and access configuration options, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device may change the guidance experience on another media device, regardless of whether they are the same or a different type of media device. In addition, the changes made may be based on settings input by a user or system operator, as well as user activity monitored by the guidance application.

The media devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of suitable communications networks or suitable combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wired and/or wireless paths, if desired). Communications with the user equipment devices may be provided by one or more of these communications paths, but are shown as a single path in FIG. 4 to avoid overcomplicating the drawing.

Although communications paths are not drawn between media devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with media devices 402, 404, and 406 are shown as through communications network 414, in some embodiments, sources 416 and 418 may communicate directly with media devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the media devices using any suitable approach. In some embodiments, the guidance application may be a stand-alone interactive television program guide that receives program guide data via a data feed (e.g., a continuous feed, trickle feed, or data in the vertical blanking interval of a channel).

Program schedule data and other guidance data may be provided to media devices on a television channel sideband, in the vertical blanking interval of a television channel, using an in-band digital signal, using an out-of-band digital signal, or by any other suitable data transmission technique. Program schedule data and other guidance data may be provided to media devices on multiple analog or digital television channels. Program schedule data and other guidance data may be provided to the media devices with any suitable frequency (e.g., continuously, daily, a user-specified period of time, a system-specified period of time, in response to a request from media devices, etc.). In some approaches, guidance data from media guidance data source 418 may be provided to users' media devices using a client-server approach. For example, a guidance application client residing on the user's media device may initiate sessions with source 418 to obtain guidance data when needed. Media guidance data source 418 may provide media devices 402, 404, and 406 the media guidance application itself or software updates for the media guidance application.

Media guidance applications may be, for example, stand-alone applications implemented on media devices. In other embodiments, media guidance applications may be client-server applications where only the client resides on the media device. For example, media guidance applications may be implemented partially as a client application on control circuitry 304 of media device 300 and partially on a remote server as a server application (e.g., media guidance data source 418). The guidance application displays may be generated by the media guidance data source 418 and transmitted to the media devices. The media guidance data source 418 may also transmit data for storage on the media device, which then generates the guidance application displays based on instructions processed by control circuitry.

Media guidance system 400 is intended to illustrate a number of approaches, or network configurations, by which media devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, media devices may communicate with each other within a home network. Media devices can communicate with each other directly via short-range point-to-point communication schemes describe above, via indirect paths through a hub or other similar device provided on a home network, or via communications network 414. Each of the multiple individuals in a single home may operate different media devices on the home network. As a result, it may be desirable for various media guidance information or settings to be communicated between the different media devices. For example, it may be desirable for users to maintain consistent media guidance application settings on different media devices within a home network, as described in greater detail in Ellis et al., U.S. Patent Application Publication No. 2005-0251827, published Nov. 10, 2005. Different types of media devices in a home network may also communicate with each other to transmit media content. For example, a user may transmit media content from user computer equipment to a portable video player or portable music player.

In a second approach, users may have multiple types of media devices by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's media devices directly, or by communicating with a media guidance application on the user's in-home media devices. Various systems and methods for media devices communicating, where the media devices are in locations remote from each other, is discussed in, for example, Ellis et al., U.S. Patent Application Publication No. 2005-0028208, published Feb. 3, 2005, which is hereby incorporated by reference herein in its entirety.

In a third approach, users of media devices inside and outside a home can use their media guidance application to communicate directly with media content source 416 to access media content. Specifically, within a home, users of user television equipment 404 and wireless user communications device 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments a media device may be capable of detecting and identifying users automatically. The device may log a detected and/or identified user into the device and utilize profiles and/or information associated with the user to, for example, tailor media content for the logged in user.

In some embodiments, the device may be able to detect, identify, and login more than one user automatically. This may allow the device to, for example, tailor media content to the combination of the logged in users without requiring manual input from the multiple users. The actions a device may make before, during, and after detection of one or more user may be configured through, for example, the configuration menu screens described below.

Figure 5:
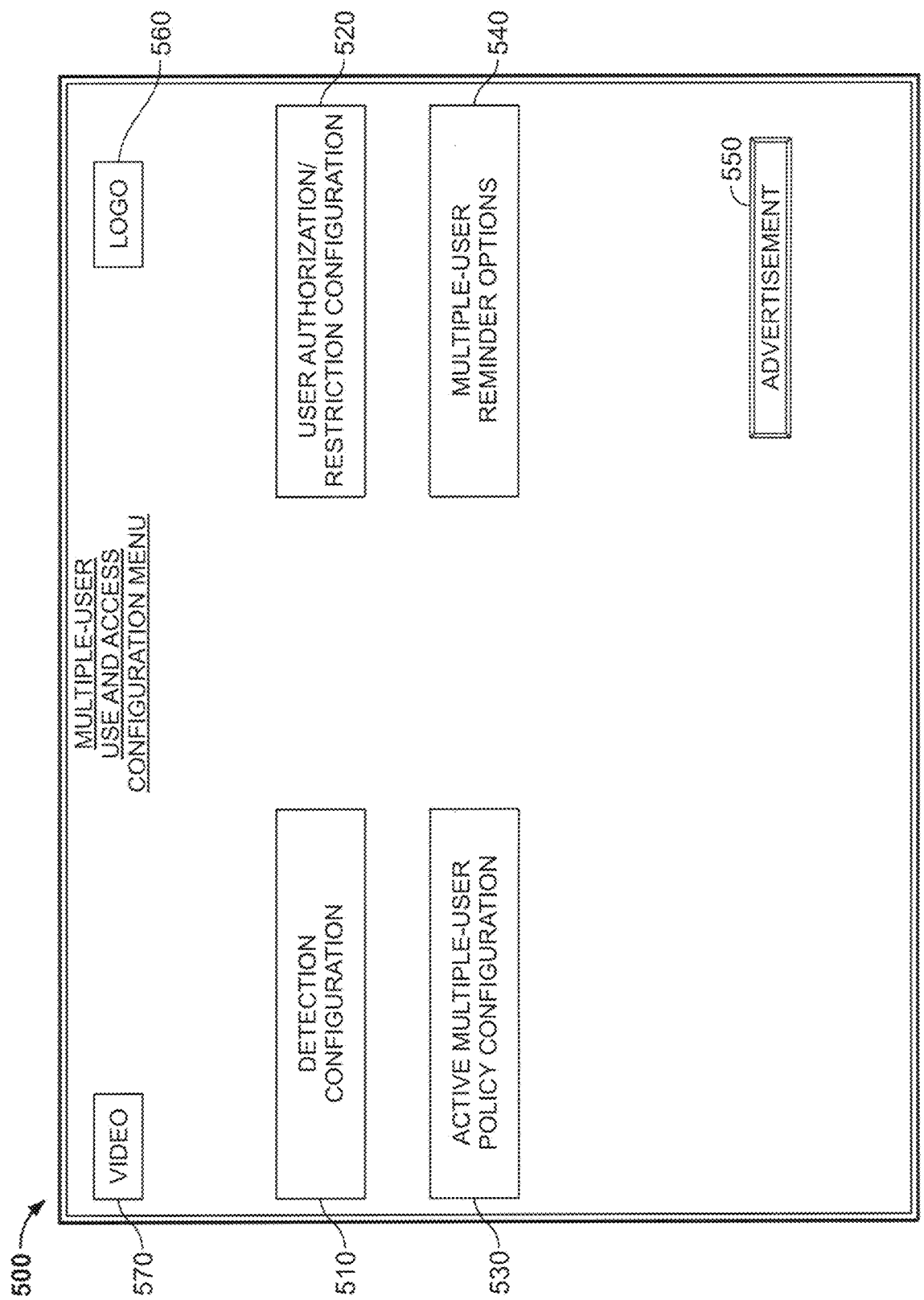
FIG. 5 is an illustrative display of a multiple-user use and access configuration menu in accordance with another embodiment of the invention.

FIG. 5 is an illustrative display of a multiple-user use and access configuration menu screen 500 in accordance with some embodiments of the systems and methods described herein. Screen 500 may include options for detection configuration 510, user authorization/restriction configuration 520, active multiple-user policy configuration 530, and multiple-user reminder options 540. In some embodiments, screen 500 may accessed through options region 126 of FIG. 1 or by any suitable method. In some embodiments, configuration options may be configured for the user performing the configuration, any other suitable user, a local device, or any other suitable device. The configuration option selections may be stored in any suitable location, for example, storage 308 of FIG. 3 and/or at any other suitable device and/or server. In some embodiments, the option selections may be associated with and/or apply to any suitable user, for example, by associating the selections with a respective user profile.

Screen 500 may include advertisement 550 which may have the same or similar functionality as advertisement 124 of FIG. 1. Advertisement 550 may be placed in any suitable location within screen 500. Additionally, or alternatively, logo 560 may be displayed identifying the sponsor of the software application that provides the media multiple-user use and access functionality. Video window 570 may also be displayed with may have similar functionality as video region 122 and may be placed in any suitable location within screen 500.

A user may access multiple-user use and access configuration menu screen 500 to set up user equipment device functionality and personal user preferences related to automatic multiple user detection and use. A user may access screen 500 from any local or remote device. For example, a user may access screen 500 from a remote website using a PDA or any other suitable mobile device. In some embodiments, the user may configure the multiple-user use and access functionality (discussed in detail below) by accessing a vendor's website (e.g., TVGuide.com). The configuration may be downloaded automatically and/or manually from the website to the user's home equipment when necessary. The user may also access screen 500 locally using the user television equipment 402 of FIG. 4 to configure the multiple-user use and access functionality.

In some embodiments, a user may at least partially configure the multiple-user use and access functionality of a device or devices through detection configuration 510 (e.g., configuring how users are automatically detected). For example, a user may be automatically identified by a user equipment device using, for example, detecting circuitry 307.

Subsequently, the user may be regarded as an active user of the user equipment device or another user equipment device. There are many methods in which a device may identify a user including, but not limited to, biometric recognition and recognition of a device associated with a user. Further, there are many courses of action that a user equipment device may take once a user is identified and regarded as an active user of the device. A user may configure these methods and options through, for example, detection configuration screen 600 of FIG. 6. Detection configuration screen 600 may be accessed by a user by selection of detection configuration option 510 in screen 500 of FIG. 5.

Detection configuration screen 600 may include detection region configuration options 610, recognition configuration options 620, and after user detected configuration options 630.

Detection region configuration options 610 may allow a user to define a proximity and/or region near a media device such that when a user is within the proximity and/or region, the user will be considered an active user of the media device. For example, a user may define the boundaries of the detection region, for example, within the defined boundaries a user may be considered an active user at the associated device, otherwise the user will not be considered an active user at the associated device. For example, if a user sits down in front of a first device and is detected within the configured region, the user may be automatically logged into the device so that, for example, the user's personal settings are available to the user.

In some embodiments, detecting circuitry 307 may be capable and/or configured to tracking the movement of users using, for example, detection configuration screen 600. For example, detecting circuitry 307 may be capable of determining the trajectory of a user. As discussed above, detecting circuitry 307 may track the movement of users using any suitable method. The detecting media device may communicate the trajectory information to another suitable media device. For example, the other media device may be in the path of the user's movement. With the information that the tracked user may be heading toward the other media device, the other media device may preemptively turn on the other media device and/or preload the tracked user's profile in anticipation of the user's arrival. This may minimize, for example, startup, load, and/or login times that the user may experience upon entering the other media device's detection region.

In some embodiments, media devices may associate movement patterns of users with particular actions. For example, a media device may detect that a particular user often leaves the device's detection region at roughly a 45 degree angle in relation to the device before entering the detection region of another media device in a separate room. As such, when the user is detected to leave the device's detection region at roughly a 45 degree angle, the device may provide information to the other media device that the user may arrive within the other media device's detection region within a short time.

As another example, a media device may detect that a particular user often temporarily leaves the device's detection region for thirty minutes or less when the user leaves the detection region by going around a living room couch. As such, when the user is detected to leave the device's detection region after going around the living room couch, the device may temporarily go into a sleep mode, as opposed to shut down, if there are no other active users at the device in anticipation that the user will most likely return within thirty minutes. Additionally, or alternatively, if there are other active users at the media device, the device may adjust targeted media content and/or suggested media content accordingly for the remaining users. For example, the device may recommend a short film that is less than thirty minutes long which the remaining users would likely enjoy, but the user who left (and will likely return within thirty minutes)

would likely not enjoy. Determining whether a user would likely enjoy or not enjoy media content is discussed further below.

In some embodiments, the media device may store detected users' movements in any suitable location, for example, locally or remotely. In some embodiments, the stored user movements may be correlated in any suitable manner with a respective user's actions subsequent to the stored movements. The correlated data may be used to define probabilities to future movements of the particular user. For example, any suitable pattern recognition technique may be utilized to determine whether a user or users has exhibited a particular movement pattern in the past. Additionally, any suitable pattern recognition may also be utilized to determine whether a user or users are likely exhibiting at least one of the determined past movement patterns in real-time (e.g., as a user is in the process of moving). There is likely to be slight variations in a movement pattern from one movement to another, however, a robust pattern recognition technique should be able to account for these variations and correctly determine the corresponding movement pattern.

In some embodiments, the correlated data regarding the movements of one user may be extrapolated to other users of the media device. For example, multiple users may be detected within the detection region of a particular device. Of the multiple users, only one regularly utilizes the particular device. Therefore, the particular device may have identified many movement patterns associated with the regular user at the particular device. Conversely, the particular device may have identified minimal, if any, movement patterns associated with other users at the particular device. If the user who uses the particular device regularly usually exhibits a particular movement pattern before moving to a second media device, then the particular device may assume that other users for which the device has little movement information may exhibit the same movement behavior and subsequent actions. As such, if the other users exhibit a same movement pattern as the regular user, the media device may determine that the other users would likely perform the same actions as the regular user when the regular user exhibits the references movement pattern.

In some embodiments, a media device or media devices may determine that a user is relatively active or relatively static. For example, the media devices may determine that a user is moving between multiple media devices within relatively short time intervals. This may happen when a user is in the process of cleaning their home and the user must traverse several rooms continuous over a short time period (e.g., the user stays within the detection region of a media device for ten minutes or less). This is in contrast to maintaining a relatively stationary position on a couch in a living room for a relatively prolonged period (e.g., the user stays within the detection region of a media device for thirty minutes or more). When a user is determined to be relatively active by one or more media device, the media devices may synchronize, for example, media content and/or user profiles across the multiple media devices so that the user may maintain relatively uninterrupted access to content as the user moves between devices.

In some embodiments, configuration of the detection region using detection configuration screen 600 may avoid a situation where a user is detected at a media device, but actually does not intend to use the device. For example, a user may be cooking in a kitchen far from the device, however, the device is still capable of detecting and identifying the user despite the fact that a user probably does not wish to utilize the device if the user is far from the device. In some embodiments, the configuration of the detection region may be based on viewing angles of, for example, display 312. For example, a detection region's border may be limited so that it is within a reasonable viewing angle of the respective media device's display. In some embodiments, the reasonable viewing angle may be manually configured by a user and/or system operator. In some embodiments, the reasonable viewing angle may be intrinsic to the display.

In some embodiments, detecting circuitry 307 may recognize objects within the display's viewable range and adjust the detection region such that when a user is behind the object, the user would not be considered an active user at the respective media device. For example, detecting circuitry 307 may recognize a wall that is within the display's viewable range. As such, the media device may set the detection region such that the wall is outside the detection region or is part of a border of the detection region. In such an embodiment, any user behind the wall would not be considered an active user at the device. Configuration of the detection region may also include configuring a length of time a user may be within the detection region to be considered an active user at the associated device. For example, a user who is simply walking through a detection region may not have any intention to begin utilizing a device. In such situation, it may not be desirable to consider this user an active user.

Additionally, or alternatively, detection region configuration may avoid device use conflicts. For example, two devices may be within relatively close proximity to each other. Without defined detection regions, a user may mistakenly be determined to be active at both devices, if the devices' respective detection regions overlap. In some embodiments, it may be desirable for the detection regions to overlap.

In some embodiments, a user may manually configure the detection regions of a media device by, for example, selecting button 612 or alternatively allow a device or devices to automatically configure the regions by, for example, selecting button 614. If button 612 is selected, a user may manually configure the detection regions by, for example, walking in the areas the user would like to be considered active by the device when detected within those areas. Upon selection of button 612, the device may go into, for example, a manual configuration mode. While in the manual configuration mode, the user may, for example, move through areas the user would like to set as a detection region, and the user may affirm verbally and/or electronically that the current position of the user is to be part of the respective device's detection region. When outside of the desired detection region, the user may verbally and/or electronically affirm that the current location of the user is not to be part of the detection region. The manual configuration may be done using any suitable means.

If button 614 is selected, devices may automatically configure the detection regions using any suitable technique, for example, using any suitable spatial recognition technique. For example, a device may recognize that a couch is positioned to face the device. In such a case, the device may add the couch to the device's detection region. If the couch is positioned to face away from the device, the couch may not be added to the device's detection region. In some embodiments, devices may communicate information regarding their own detection regions or other device's detection regions to other devices. This may assist with the configuration of the detection regions, for example, it may allow device to resolve detection region conflicts (e.g., when more one device would register a user as active at the device when the user is within a particular area).

In some embodiments, the detection regions may adapt in real-time. For example, mobile devices may be associated a particular detection region when no other media device is within a detectable range to the mobile device. When the mobile device comes within a detectable range of, for example a television, the mobile device and television may reconcile each the respective detection regions. For example, it may be desirable to provide media content primarily on the television whenever the mobile device is within a detectable range of the television. In such an embodiment, the mobile device's detection region may be nullified when, for example, the respective device's detection regions overlap so that any user within the overlapping detection regions would be considered active at the television and not the mobile device.

In some embodiments, overlapping detection regions may be given a priority, so that, for example, particular actions and/or content may be provided on one overlapping device over the another overlapping device. For example, a user may be within the detection regions of both a mobile device and a television and it may be desirable that text-messages be provided on a user's mobile device while the user is accessing media content on a television. As such, the mobile device may be given a higher priority for text-messages when compared to the television in an overlapping detection region situation. In some embodiments, the priority levels may be configured in for example, detection configuration screen 600 for any suitable action and/or content.

Once detection regions are configured, a user may test the detection region configuration by selecting button 616. A user, device, and/or devices may test the detection region configuration using any suitable technique. For example, a user may position themselves within the configured detection regions and/or outside the configured detection region for any suitable amount and time and determine whether respective devices' detection and/or identification of the user is satisfactory.

In some embodiments, a user may configure what techniques a media device or media devices may use to detect, track movement of, and/or identify users within the device's detection region using, for example, detecting circuitry 307, as illustrated by recognition configuration options 620. For example, a user may configure a device or devices to detect, track movement of, and/or identify a user using any suitable biometric recognition technique, any suitable device recognition technique, any suitable radar and/or sonar recognition technique, and/or any other suitable recognition technique. In some embodiments, detecting circuitry 307 may utilize any suitable image processing, video processing, and/or computer vision technique and/or any other suitable technique to detect, track movement of, locate and/or identify users, and/or determine any other suitable information regarding a user within the device's detectable range. For example, a user may enable biometric recognition capabilities by selecting option 622 or, alternatively, disable biometric recognition capabilities by selecting option 624, wherein the biometric techniques may include any of the techniques described above in connection with FIG. 3 or any other suitable technique. In some embodiments, a user may be detected, tracked, and/or identified by way of device recognition. For example, a mobile device (e.g., a mobile phone or an RFID tag) may be associated with a particular user or users.

In some embodiments, when the mobile device is within a detectable range of a media device and/or within the detection region of a media device, the media device may be capable of identifying the mobile device through any suitable identification method (e.g., RFID, detection of the mobile device's media control access address, and/or any other suitable identification method). After the media device identifies the mobile device, the media device may then identify the user associated with the mobile device by, for example, looking up information associated with the mobile device from a server and/or local storage. In some embodiments, the mobile device may transfer information about the associated user or users to the media device. The information about the associated user or users may be stored in the mobile device and/or at a remote server.

In some embodiments, a user and/or mobile device may only be detected (e.g., not identified). For example, a mobile device may initiate Bluetooth communications with a media device when nearby the media device. In response to detecting the Bluetooth communications, the media device may ascertain that a user is within a detectable distance to the media device and/or that a user is within the media device's detection region. In some embodiments, a user may test their configurations by selecting button 626. If a user requires more information about any of the recognition options, the user may select button 628 to request more information.

In some embodiments, a user may configure options associated with what actions a device performs after a user is detected, as illustrated by user detection configuration options 630. For example, a device may automatically turn ON or activate a display in response to detecting and/or identifying a user within the detection region of the device. In some embodiments, turning ON or activating may refer to a device that comes out of a "sleep" mode which, for example, may be used to save power, but does not require a full start upon coming out of the sleep mode. Alternatively, a device may provide an option to turn ON a display in response to detection and/or identification of a user within the detection region of the device. It should be noted that the option does not necessarily need to be displayed on the device that detected the user or the device that may be turned on. For example, either a living room television or a mobile device on the user's person may detect that the user entered the detection region for their living room television. In response to this detection, the living room television may automatically turn ON, or alternatively provide an option to turn ON the television, wherein the option is provided on the user's mobile device or on the television itself.

In some embodiments, if a device is on and no active user is detected, the device may deactivated (e.g., turned OFF or put into a "sleep" mode) to, for example, conserve energy. In some embodiments, deactivating may refer to a device that goes into a "sleep" mode which, for example, may be used to save power and does not require a full start upon coming out of the sleep mode. While in sleep mode, the device may have some components that remain active or partially active. For example, processing circuitry 306 and detecting circuitry 307 may remain substantially and/or partially active while the device is in sleep mode so that the device may retain the capability to detect users within the device's detectable range. Other components may be substantially inactive while the device is in sleep mode. For example, display 312 and speakers 314 may be substantially inactive while the device is in sleep mode. Display 312 and speakers 314 may be reactivated when the device comes out of sleep mode so that the device is fully active.

The device may also be configured to turn OFF after a predetermined period of time wherein no user is detected. For example, a device may turn OFF if the device does not detect a user for five minutes. The actions performed by a device in response to detecting and/or identifying a user and/or determining that a user is active or inactive may depend on the configuration of options 630. In some embodiments, a device may only perform the options configured in options 630 for users who are authorized to utilize the device. User authorization and access is discussed in greater detail below.

In some embodiments, screen 600 may include option 652 to allow a user to enable all available options related to the detection configuration. Screen 600 may also include option 654 to disable all available options related to the detection configuration. Option 656 allows a user to easily select default detection configuration options. Option 658 allows a user to save their configuration options. Option 660 allows a user to cancel any changes they made to their configuration options. When a user is done making configuration changes, a user may select option 662 to complete and save the configuration changes. If a user needs additional information regarding any of the options, the user may select option 664 to request additional information regarding the configuration options.

In some embodiments, screen 600 may include video window 670, logo 680, and advertisement 690, which may be substantially similar to video window 570, logo 560, and advertisement 550 of FIG. 5, respectively. Video window 670, logo 680, and advertisement 690 may be placed in any suitable location and in any suitable configuration within screen 600.

In some embodiments, a user may at least partially configure who is authorized and/or restricted from a particular device or devices through user authorization/restriction configuration 520 of FIG. 5. For example, many users may be detected by a device, however, the owner of the device may not want every detected user to have access to the device, or may want to restrict actions other users may perform once they have gained access to the device. Once a user selects user authorization/restriction configuration 520, user authorization/restriction configuration screen 700 may be displayed to allow the user to configure user authorization and restriction options. User authorization/restriction configuration screen 700 may include known user access configuration section 710, general authorization options 720, and login options 730.

Figure 7:
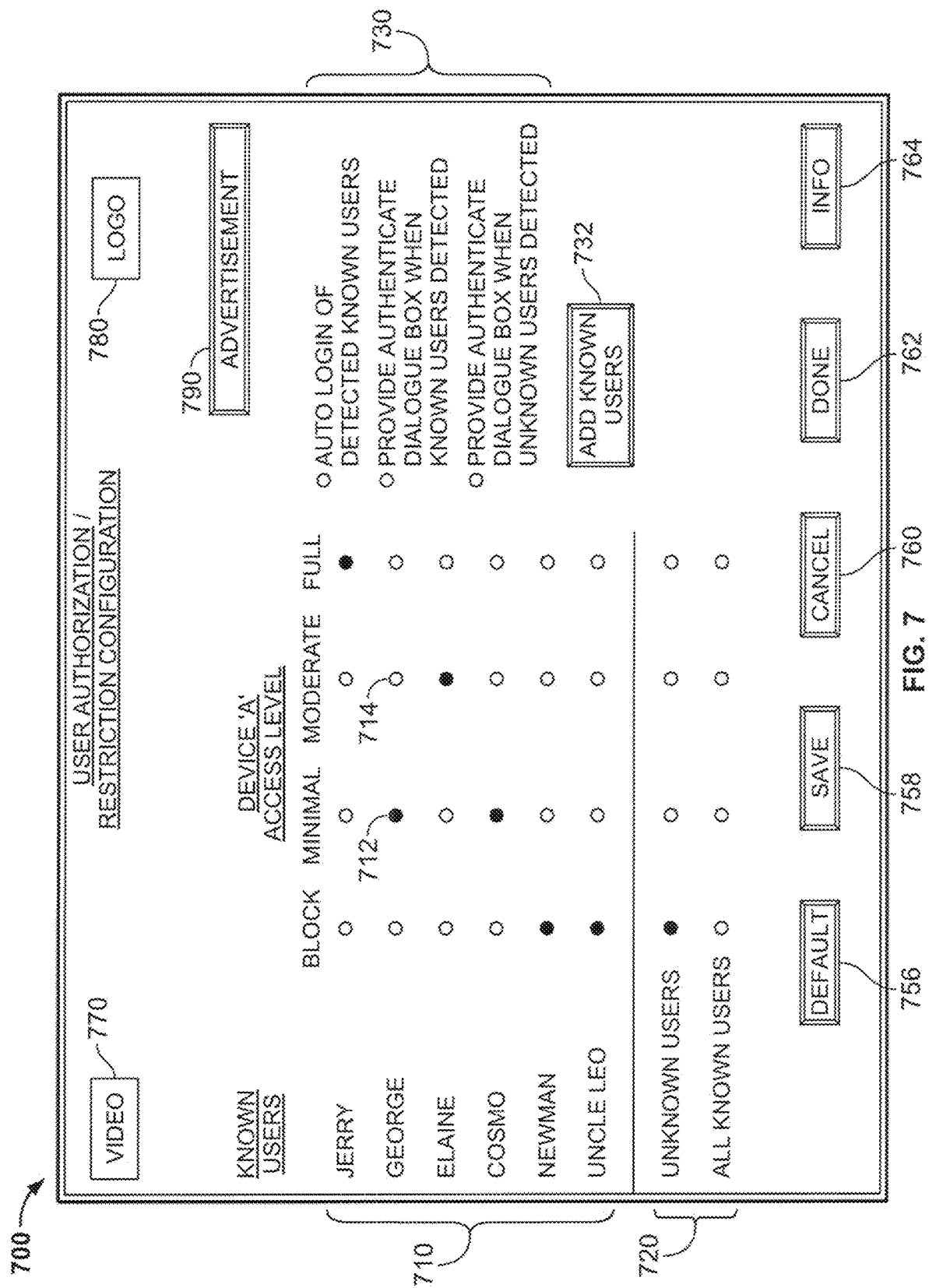
FIG. 7 is an illustrative display of a user authorization/restriction configuration menu in accordance with another embodiment of the invention.
Figure 8:
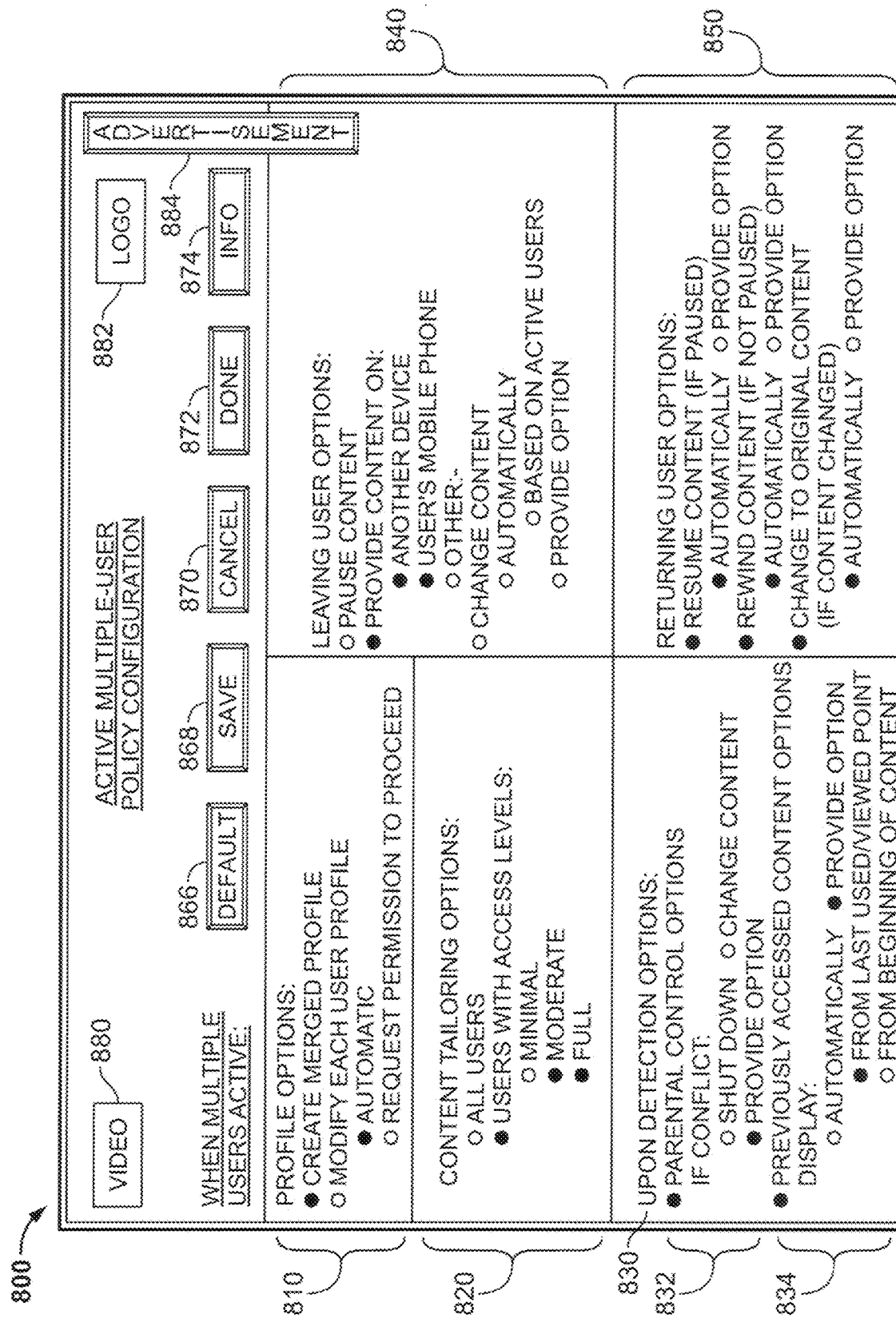
FIG. 8 is an illustrative display of an active multiple-user policy configuration menu in accordance with another embodiment of the invention.

Known user access configuration section 710 may allow a user to review which users are known to a particular or multiple devices and review the users associated access rights. For example, user George may be known to device A as illustrated by FIG. 7. Here, George's access level is set to "minimal." This setting may restrict particular actions George may perform on device A. For example, George may not be able to adjust various configuration options related to device A, view or change local data. In some embodiments, a user may want to completely block a known user from any access to a device. For example, user Newman is known to device A as illustrated by FIG. 7 and has an access setting associated with him set to "block." A blocked setting may prevent user Newman from accessing and/or modifying any portion of device A.

In some embodiments, a blocked setting may prevent device detection and/or identification between Newman's devices and the device from which he is blocked. In some embodiments, a blocked user may not log into the associated device. Additional access level setting illustrated in screen 700 are "moderate" and "full" access. A user may change the access level associated with a particular user by selecting a different available option. For example, George's access level may be changed by a user with a sufficient access level by selecting moderate option 714 instead of the currently selected minimal option 712. It should be noted that while only four different levels of access are illustrated, any suitable number of levels or other method for providing or restricting a user's access to a device may be used and configured in any suitable manner. In some embodiments, access rights displayed may or may not be related to devices the user owns.

In some embodiments, general authorization options 720 may be provided. Here, a user may provide general access levels, for example, for all known users and all unknown users. As illustrated by FIG. 7, the current settings for device A provide that all unknown users are set to an access level of "block." This may mean that, for example, all unknown users may be denied access to device A. For example, a user who has never used device A may automatically be denied access to device A even if they move into device A's detection region. In some embodiments, the options selected may apply to any suitable user, for example, a detected user, identified user, and/or a user with any suitable access level, or any other suitable user.

In some embodiments, login options 730 may be provided. Here, a user may configure what login and authentication procedures a device may perform in response to particular events. For example, if a known user is detected by device A, or is within device A's detection region, the user may be automatically logged into device A, thus providing access to the user for device A, as well as personalized setting for the user. Alternatively, a dialogue box may be provided to provide users with an option to authenticate the detected user and/or give the user access (temporary or any other suitable type of access) to the device. In some embodiments, a similar dialogue box may be provided if the user is unknown to the device. Authentication of a user, known or unknown, may be provided by another user with sufficient access rights and/or the user themselves. In some embodiments, a user may add additional users to the known users list on a device by selecting the add known users option 732. For example, this may allow one user to preemptively authenticate on a device another user before the other user is ever detected by the device. In some embodiments, user access lists may be imported from one device to another.

Figure 6:
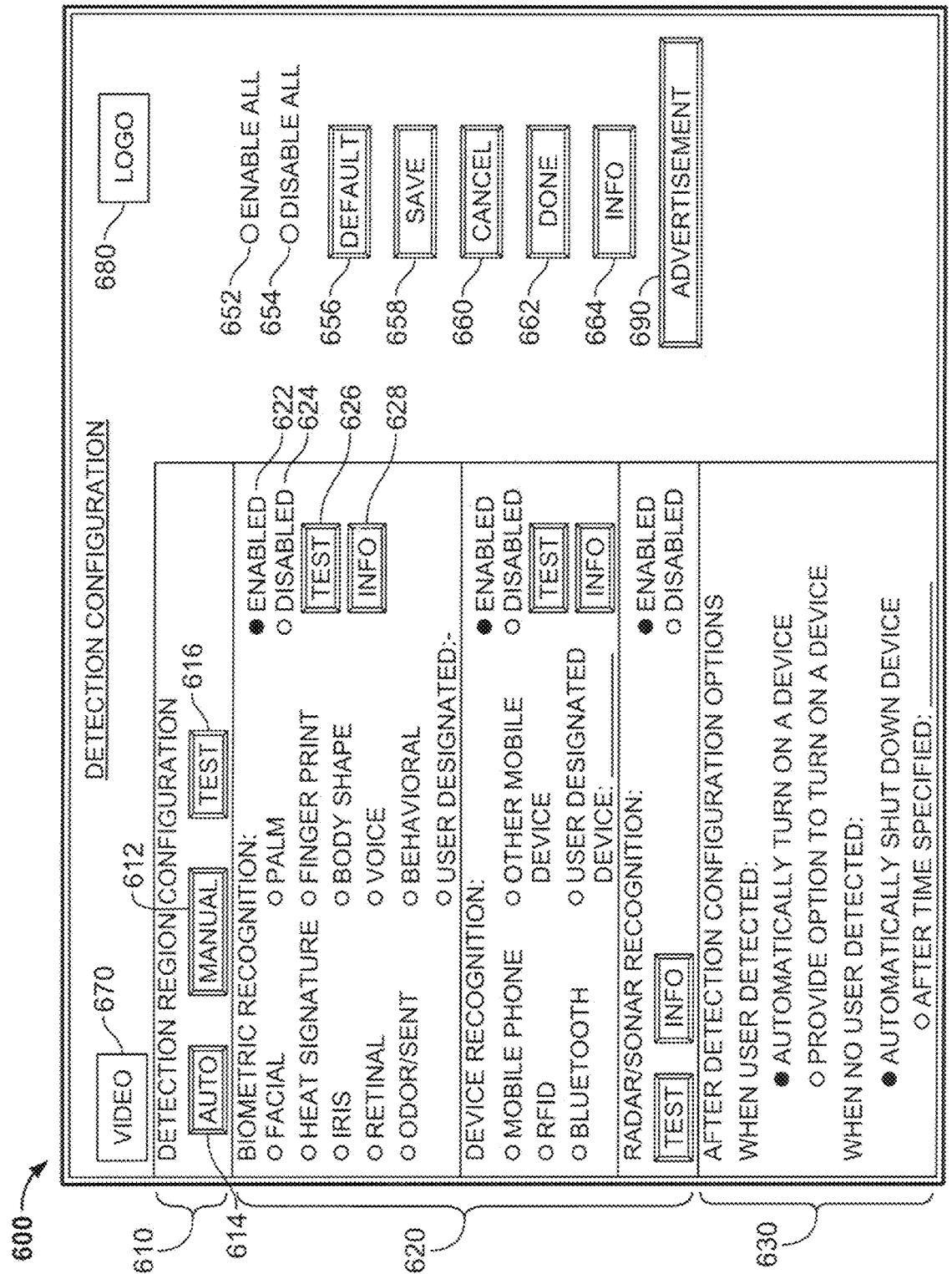
FIG. 6 is an illustrative display of a detection configuration menu in accordance with another embodiment of the invention.

In some embodiments, screen 700 may include default option 756, save option 758, cancel option 760, done option 762, info option 764, video window 770, logo 780, and advertisement 790, which may be substantially similar to default option 656, save option 658, cancel option 660, done option 662, info option 664, video window 670, logo 680, and advertisement 690 of FIG. 6, respectively, each of which may be placed in any suitable location and in any suitable configuration within screen 700.

In some embodiments, multiple users may be detected and/or identified by a device and/or devices, and thus, multiple users may be considered active users of the same device. The multiple users may be detected, for example, at the same time, or, for example, a second user may be detected at some time after a first user begins to navigate the device and/or after the first user begins to access media content. Here, an active user may refer to a user who is within a device's detection region, detected to be within the detection region by the device and/or any other suitable device, identified by the device and/or any other suitable device. In some embodiments, after a user is detected and/or identified, the user may be added to a list of active users at the device. The list may be stored at the device and/or at any other suitable user and/or system device. For example, active user lists may be maintained at a local device and/or a centralized server. In addition to, or alternatively, a detected and/or identified user may be logged into the device.

In some embodiments, it may be desirable to handle multiple user situations to, for example, tailor content to all active users of a device or devices as opposed to a single user. For example, there may be multiple users accessing content at a single device and/or multiple users accessing the same content concurrently at different devices. Additionally, it may be desirable to handle situations wherein, for example, one active user becomes temporarily or permanently inactive, while a different user remains active at the device. In some embodiments, a user may at least partially configure these and other policies and actions a device or devices may take when multiple users are active at the respective device or devices using active multiple-user policy configuration screen 800 of FIG. 8. Screen 800 may be accessed by user selection of active multiple-user policy configuration option 530 of FIG. 5. Screen 800 may include merged profile options 810, content tailoring options 820, when user detected options 830, leaving user options 840, and returning user options 850.

Merged profile options 810 may allow a user to define how profiles associated with each active user at a device are utilized by the device. For example, the device may create a temporary or permanent merged profile that combines information relating to each user into a single profile. The information relating to each user may include, but is not limited to, demographic information (e.g., income level, work location, home location, marital status, race, sex, age, religion, disabilities, mobility, number of vehicles, average travel time, educational attainment, home ownership, employment status, etc.), media content use trends, viewing and/or listening habits, buying habits, advertisement viewing and/or selection habits, electronic programming guide habits, or any other suitable information pertaining to a user or users. Profiles may be merged in any suitable manner. For example, profile conflicts between user profiles may be resolved by averaging values associated with each user's profile entries.

In some embodiments, values in one or more user profiles may be weighted in a manner that would give some values in some users' profiles more influence in the merged profile over other users' profiles. For example, the preferences of an active user who owns the respective media device may be given a greater weight when determining the merged profile in contrast to users who do not own the device. In some embodiments, users who utilize the respective media device more often or less often than other active users at the device may be given a greater or less weight when determining the merged profile. In some embodiments, the weighing of a user's preferences when determining the merged profile may be related to the user's proximity to the device. For example, if a first user is further away from a media device than a second user, the preferences of the second user may be given more weight when determining the merged profile.

In some embodiments, profile differences may be resolved using a voting mechanism. For example, if two active users prefer chocolate, while the other active user does not, the merged profile would reflect the group of active users overall preference for chocolate. For example, advertisements may be targeted on the basis that the group of active users has a preference for chocolate. In some embodiments, preferences that are in the minority when compared to the group of active users at a device would have little to no effect on the merged profile. Additionally, or alternatively, if there is a tie between active users' preferences (e.g., two users prefer chocolate, two do not), the respective merged profile preference may be decided on the basis of the user who owns the device. For example, the merged profile preference may be equated to the owner's default preferences.

In some embodiments, the merged profiles may be used to target and/or recommend advertisements, media content, or actions related to media content (e.g., recommend accessing, recording, purchasing, or setting reminders related to media content) or any other suitable action. The merged profiles may help to better target advertisement and/or provide services to all active users watching as opposed to targeting actions for just one logged in user even if multiple users are active. In some embodiments, the merged profile creation may be automatic or, alternatively, a device, for example, device 300, may request permission to proceed with performing merged profile creation operations. For example, a user may object to the creation of a merged profile for privacy concerns.

In some embodiments, a merged profile might not be separately created, but instead, or additionally, selected portions of the active user's profiles may be resolved, for example, in real-time, in order to target and/or provide advertisements and/or services. Information relating to any suitable actions of the multiple active users at a device may be used to dynamically update the merged profile. For example, a first and a second user may perform a particular set of actions more often than if either user utilizes a device separately from each other. For example, a husband may view action movies while alone or with friends, but the husband may view sitcoms when using a device with his wife. Merged profiles may be modified to incorporate such information, and thus better tailor content to a particular set of multiple active users. Alternatively, or additionally, such information may be utilized to update the user's respective profiles. The action used to update profiles may be any suitable action that may be performed on a device. Data relating to merged profiles may be stored in any suitable location for any suitable length of time. This may allow a device to refer to a past merged profile when a particular set of multiple users become active together again.

Content tailoring options 820 may allow a user to configure to whom content may be tailored, wherein tailored content may refer targeting and/or recommending advertisements, media content, or actions related to media content, or any other suitable action as described above. For example, a user may choose that content may only be tailored toward users with a particular device access level, for example, full access. Alternatively, or additionally, a user may choose that content be tailored toward all users, users with minimal, and/or moderate access levels, or any other suitable combination of access levels, or any other suitable user (e.g., regardless of access level). In some embodiments, a user may select what type of content may be tailored (not shown in FIG. 8). For example, a user may choose that to have only advertisements tailored to all active users, while media content recommendations may only be targeted toward users with full access to the device.

In some embodiments, tailoring the content may include providing reminders for content associated with all or selected users. Selected users may include users of a within selected groups, for example, users within selected age groups and/or user access level groups. For example, if multiple users are active at a device and a reminder associated with one of the users is scheduled to be displayed, the reminder associated with the user may be displayed. In some embodiments, the reminder may include options to provide the content associated with the reminder on the current device, a device associated with the user for whom the reminder was associated (e.g., the user's mobile device), and/or any other suitable device. In some embodiments, the reminder may only appear if the associated content does not conflict with other active users' preferences. Alternatively, or additionally, the reminder may include a warning that one or more of the active users may not enjoy the reminded content and/or one or more of the active users' profiles conflicts with the reminded content. For example, the reminded content may conflict with parental control settings and/or other profile preference settings of an active user. In some embodiments, the reminder may include a message recommending the content to the other active users if their profiles agree with the reminded content. For example, the reminded content may be an action movie and all the active users' profiles may indicate that they enjoy action movies. As such, an indication may be included in the reminder that states, for example, "Reminder set for action movie1 by user1. user2 has a 76% chance of enjoying this movie." In some embodiments, the probability value may be converted into any suitable numerical or graphical representation. For example, the 76% may be represented in the reminder by 3 out of 4 stars.

To determine whether an active user would probably like or dislike reminded content, probability values may be determined. For example, the probability values may be determined based on values within the respective user's profiles that indicate how much the users like or dislike a particular genre of entertainment as well as based on the characteristics of the reminded content. For example, if a user's profile indicates that the user generally enjoys action movies and generally dislikes comedies, a probability value regarding a new action movie may indicate that the user would probably enjoy the new action movie. Conversely, a probability value regarding a new comedy may indicate that the user would probably not enjoy the new comedy. The probability values may be computed in any suitable manner, for example, the values may be based on any suitable parameter within the respective user's profile, the user's content access history, profiles or histories of the user's friends or family, demographic categories, user's with similar profiles or histories, or any other suitable parameter. In some embodiments, users may set manually or media devices may determine automatically preferences associated with particular actors and/or actresses, genres, program types, and the current mood of the user or users, or any other suitable preference and/or aspect of the users' profiles. Various systems and methods for determining users' preferences for media content are discussed in, for example, Yates, U.S. patent application Ser. No. 11/324,202, filed Dec. 29, 2005, which is hereby incorporated by reference herein in its entirety.

In some embodiments, user preferences may vary between different media devices. For example, a user may not want details of the user's profile from one media device to impact media availability when moving to another media device. For example, user's content access history and/or any other suitable preference indicator may be excluded, included, and/or modified when targeting content and/or determining probabilities for enjoyment at multiple media devices. For example, a user may be more inclined to watch 'R'-rated movies while in the user's bedroom and home office, but only watch 'PG'-rated movies while in the user's living room. As such, this aspect of the user's content access history may be utilized when determining probabilities for enjoyment differently at different media devices. For example, 'PG'-rated movies that the user accessed in the user's living room may not influence targeted media content and/or media content recommendations while the user is utilizing the media devices in the user's bedroom and/or home office. The reverse may also be true. For example, 'R'-rated movies that the user accessed in the user's bedroom and/or home office may not influence targeted media content and/or media content recommendations while the user is utilizing the media device in the user's living room.

In some embodiments, users' preferences may be modified and/or updated differently depending on what device the user accesses in addition to, or alternatively from, content access history at different devices, as described above. For example, if the user accesses content at a device the user rarely uses, the properties of the accessed content may not influence changes in the user's preference profile as much as if, for example, the user accessed the same content from a device the user utilizes often. Additionally, or alternatively, a user's preferences may be modified and/or updated differently depending on with whom the user accesses content. For example, if a first user accesses content with a second user that the first user rarely accesses content with, the properties of the accessed content may not influence changes in the user's preference profile as much as if, for example, the user accessed the same content with another user that the first user access content with often.

In some embodiments, reminders may be set automatically and any associated actions may be performed automatically. In some embodiments, the reminders, associated actions, and associated options may be configured with content tailoring options 820. In some embodiments, the reminder or reminders may be have set previously by the associated user. Additionally, or alternatively, the reminders may be automatically generated by a service provider to recommend content users at a media device may enjoy. In some embodiments, the recommended content may be directed to a subset of active users at a device or all the users at the device. In some embodiments, the recommended content may also be determined by utilizing the probability values described above. Reminders that are automatically generated may include information regarding why the particular reminder was generated. For example, the reminder may state, "Automatically generated reminder for VOD program1. Generated for active user1 and user2 because they previously indicated they enjoyed broadcast program1."

In some embodiments, a user's device, for example device 300, may perform a parental control check when a new active user is detected and/or identified. For example, a mother and father may be enjoying a movie with adult content when their young child walks, unbeknownst to the child's parents, within viewing distance of the device displaying adult content. In such a situation, device 300 may register the young child as an active user of device 300, compare the child's parental control settings to the displayed movie, and immediately prevent the child from viewing the adult content if a parental control conflict is detected. A parental control conflict may be any discrepancy between characteristics of content and parental control settings associated with a user. For example, parental control settings associated with a user may stipulate that the user may not watch any movie that has a rating higher than "PG". In such a situation, the user may create a parental control conflict if, for example, the user becomes active at a device while rated "PG-13" content is being displayed. In some embodiments, a conflicted user may be prevented from viewing the content by, for example, shutting down the device, changing the displayed movie, automatically presenting an edited version of the movie, and/or providing a window that substantially obscures the movie when the user is detected by the device.

In some embodiments, a user may configure device parental control conflict response actions with parental control options 832, within the upon detection options menu 830. Using options 832, a user may select whether parental controls of users (e.g., all users, selected users, etc.) are compared to provided content for conflicts when the users are detected and/or identified near the device providing the content. In some embodiments, users may select what actions a device may take if a conflict is detected. For example, a user may configure a device to shut down, change provided content, and/or provide an option to shut down and/or change the provided content. In some embodiments, the option to shut down and/or change the provided content may be displayed in a manner that would substantially cover any displayed content so that the user who conflicts with the content would not be able to view the content. Additionally, or alternatively, any sounds associated with the content may automatically be muted upon conflict detection to prevent the conflicted user from hearing any content that conflicts with their parental control settings.

In some embodiments, the volume may substantially decrease upon conflict detection. The amount of volume decrease may be associated with how far the conflicted user is from the device providing the content. For example, if the conflicted user is relatively far from the device, the volume may not need to be decreased as much as if the user was relatively near to the device to prevent the user from hearing the conflicting content. In some embodiments, users may select which users the parental control options may apply to (not shown in FIG. 8), for example, a user may select that the parental control options apply to every detected user or, alternatively, the user may select that the options apply to selected users or groups of users (e.g., age levels, access levels), or any other suitable configuration. These configuration options and any other suitable configuration option may be configured with parental control options 832. In some embodiments, a user with a conflict need not be within the detection region of a device to cause a conflict. For example, the user may be detected by any suitable device near a device providing conflicting content.

In some embodiments, device 300 may provide previously accessed content to a new active user at the device. For example, if the last action a user previously performed on a device was download a new song, the user may be provided an option to listen to that song when the user becomes active at an other device. In some embodiments, recently downloaded media content may automatically continue to be provided at a device when the associated user becomes an active user at the device. In some embodiments, if the last action a user previously performed at a device was access media content, for example, a movie, the user may be provided an option to begin watching the movie from the point at which the user last accessed the movie. Alternatively, the media content may begin playing immediately. In some embodiments, the media content may be provided at a point different than the point at which the user last accessed the content, for example, from the beginning of the content or some suitable amount of time before or after the point.

In some embodiments, a user may adjust the actions a device may take in regard to previously accessed content when users are detected and/or identified at the device with previously accessed content options 834. For example, a user may choose to have the previously accessed content automatically displayed. Alternatively, a user may choose to have the device display an option to continue access to the previously accessed content from a point within the content at which the user last accessed it, or at any other suitable point within the content. In some embodiments, these options and/or actions may be provided in relation to a new active user at a device even when there are active users already active at the device. In some embodiments, an option may be provided to continue the previously accessed content on a device other than the device at which the user had recently been detected and/or an option may be provided to queue the previously accessed content to be provided after currently accessed content has completed. Alternatively, these options may occur automatically.

In some embodiments, a device may take particular actions when a user is detected to no longer be active at a device (e.g., the user is no longer within the device's detection region). The inactivity may be temporary (e.g., the user left the device's detection region for a short time to use the restroom) or may be more prolonged (e.g., the user left the household where the device is placed for the day). In some embodiments, a user may be removed from the list of active users and/or logged out from the device when a user is no longer active at the device. Information may be stored relating to, for example, when the user became inactive, what content was being accessed, when point of the content was being accessed, or any other suitable information relating to the activity of a user prior to becoming inactive at the device. In some embodiments, the user may be added to a list of inactive users at the device. Information related to the user's activity and/or inactivity, or any other suitable information may be included in the list of inactive users and/or associated with users on the list of inactive users and/or may be stored in any suitable location.

In some embodiments, a device may automatically pause content when a user is detected to have left the detection region. In some embodiments, a user may configure these options using leaving user options 840. In some embodiments, a device may be configured to provide an option to provide currently accessed media content on another device when a user leaves the current device's detection region. For example, a user may want to continue viewing the media content on their mobile device (e.g., a cell phone) as they leave the detection region of a device displaying the media content. In some embodiments, a device may be configured to change provided content when a user is detected to have left the detection region. The content may change to other content based on profiles associated with users who remain within the detection region of the device. For example, a husband, who is a fan of action movies, may be watching the latest romance movie with his wife. The wife may need to leave the detection region temporarily. When the wife leaves the detection region, the device may provide an option to display an action movie in which the husband had previously shown interest (e.g., the husband viewed detailed information about the action movie), any other content based on a profile associated with the husband, or any other suitable content.

In some embodiments, advertisements may change as the set of active users at a device change. For example, targeted advertisements may be targeted to both the husband and wife while they are both within the detection region of a device.

For example, an advertisement for a romantic getaway vacation may be displayed to the husband and wife. If the wife leaves the detection region, subsequent advertisement may be targeted only to the husband. In some embodiments, when a user leaves the detection region, the user or any other suitable user may be able to affirm that the leaving user has left only temporarily and/or that the user has left for a more prolonged period of time. In some embodiments, the content changes may occur automatically. Any other suitable action or options associated with a user leaving a device may be configured with leaving user options 840.

In some embodiments, a device may take particular actions when a user is detected to have returned to a device after leaving the device's detection region for less than a predetermined time-period. The predetermined time-period may be any suitable length of time (e.g., five minutes) and may in itself be configurable by a user and/or system operator. The predetermined time-period and actions associated with a returning user may be configured by a user with returning user options 850. For example, a user may configure a device to automatically resume content if the content was paused when the user left the device's detection region. If the content was not paused, the device may automatically rewind the content to the point at which it was detected that the user left the device's detection region. In some embodiments, the device may provide the content from any other suitable point within the content (e.g., a several seconds before the point at which it was detected that the user left the device's detection region). If the content was changed to different content when the user left the device's detection region, the device may change the content back to the original content when the user returns to the device's detection region. If the content was provided to another user device when the user left the device's detection region (i.e., the user became active at the other user device), the content may be provided to the original device and resume the content from any suitable point when the user returns within the device's detection region (e.g., a point in the content last accessed by the last device at which the user accessed the content).

In some embodiments, if the user becomes active at another device after leaving the original device's detection region, the other device may communicate the user's activity on the other device to the original device. For example, the other device may communicate that the user is continuing to access media content on the other device. The original device may use the information regarding the user's movement and activity to update the device's active and inactive user lists appropriately. For example, the original device may set the user as temporarily inactive when the user leaves the original device's detection region. When the user becomes active at another device, the other device may communicate the user's activity to the original device. Then the original device may set the user as inactive. Upon setting the user as inactive, the original device may provide different content more suitable for users still active at the original device.

In some embodiments, content may be paused when the user leaves the original device. When the other device communicates that the user is active at the other device, the original device may unpause the content so that the remaining users at the original device may continue to enjoy the content. For example, the other users do not need to wait for the user who left to return. The two groups of users may continue to watch the content simultaneously on two different devices.

In some embodiments, if the two groups of users reunite at a particular device (e.g., the original device or the other device), the content may be provided from substantially the point in the content where the user who made the least progress in the content left off. For example, user1 and user2 are at device1 accessing content1. User1 leaves device1 and moves to device2. In the mean time, user2 continues accessing content1. User1 then becomes active at device2 and begins to continue to access content1. However, time lapsed between user1 leaving device1 and becoming active at device2. Thus, user2 is further along in content1 then user1. User1 may then leave device2 and return device1 to continue accessing content1 with user2. Device1 may then rewind content1 to a point in content1 where user1 last accessed content1. In this example, user2 may reaccess portions of content1 that user2 had already accessed, however, user1 can continue to access content1 without missing a portion of content1. In some embodiments, an option may be provided for these actions as opposed to automatically performing the options. In some embodiments, these and any other suitable configuration options may be configured from options 850.

In some embodiments, screen 800 may include default option 866, save option 868, cancel option 870, done option 872, info option 874, video window 880, logo 882, and advertisement 884, which may be substantially similar to default option 656, save option 658, cancel option 660, done option 662, info option 664, video window 670, logo 680, and advertisement 690 of FIG. 6, respectively, each of which may be placed in any suitable location and in any suitable configuration within screen 800.

It should be noted that although screen 500, screen 600, screen 700, and screen 800 are illustrated as full-screen displays, some or all of the options of the screens may be displayed as an overlay on top of or in the same screen as a displayed media content or media content listings or in any other suitable configuration. In the screens are accessed by a user at, for example, media device 300 of FIG. 3, device 300 may adjust the size and navigation (e.g., cursor movement or selection) of the screens to conform to display characteristics of device 300. It should be noted that the configuration options are not limited to those described herein, but any other suitable configuration option may be provided for within the scope of the configuration screens described herein. The configuration options may be provided in any suitable manner and in any suitable combination. For example, the options illustrated by screen 600 may be combined with the options illustrated by screen 700 in any suitable manner to ease user access and configuration. In some embodiments, the screens and/or the options described by them may not even be accessible by users; instead the configurations may only be set by system operators, producers of the devices, or any other suitable party.

Figure 9:
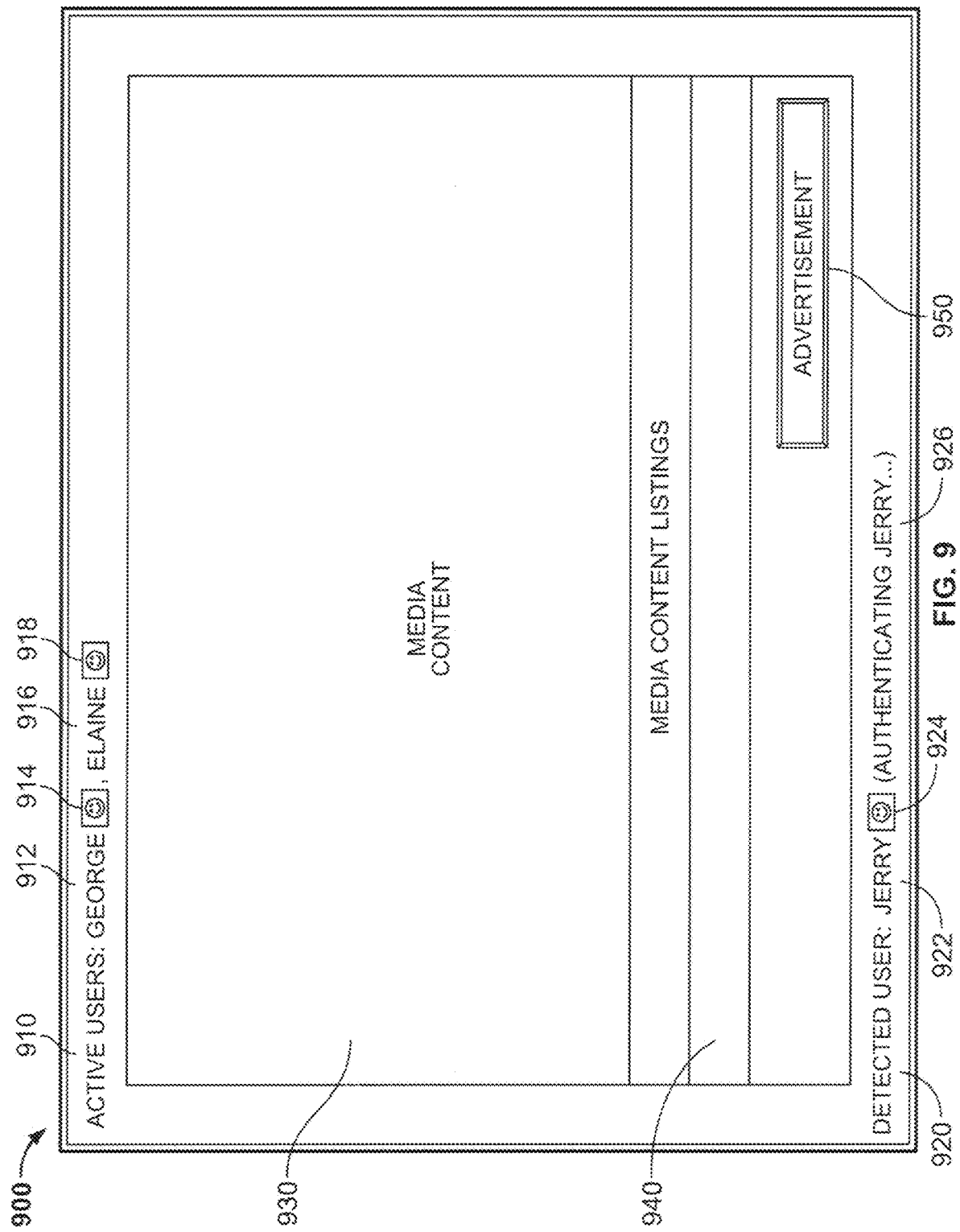
FIG. 9 is an illustrative display of active and detected users in accordance with another embodiment of the invention.

In some embodiments, list of current active users 910 may be displayed on a device's display as shown in illustrative display 900 of FIG. 9. List 910 may include identification associated with the current active users, for example, names (e.g., name 912 and name 916) and/or pictures (e.g., picture 914 and picture 918) associated with the users, and/or any other suitable identification means.

In some embodiments, list of detected users 920 may be displayed on a device's display when a user is detected by a device. These users may or may not have access rights to the device and may or may not eventually be logged into the device and/or added to the respective device's list of active users. In some embodiments, list 920 may include users which the device detects, but whom may not be within the detection region, or may not have access rights to the device. In some embodiments, list 920 may list users when the users are being authenticated by the device, as illustrated by name 922, picture 924, and status 926. Status 926 may be used to provide any suitable information regarding the status of a user in addition to, or alternatively to, information regarding the authentication of a user. For example, status 926 may provide information regarding the success of failure of the authentication attempts of user.

Active user list 910 and detected user list 920 may be provided in any suitable form and location within a device's display. For example, list 910 and list 920 may be provided temporarily and/or permanently around the border of displayed media 930, media content listings 940, and/or advertisement 950. List 910 and list 920 may be displayed when a new event occurs, for example, when another user is detected and/or when a user actives a function on the device, or when any other suitable event occurs. In some embodiments, list 910 and list 920 may never be displayed to users and/or may be kept private and/or confidential. For example, in such embodiments, only system operators may have access to the information contained in list 910 and list 920. In some embodiments, list 910 and list 920 may be maintained locally at the corresponding device, at another user's device, and/or at any suitable system device. For example, the list of active users and/or detected users at a first device may be stored and maintained on user's second device and/or at a cable headend. In some embodiments, the information contained in list 910 and list 920 may be audible instead of, or in addition to, displaying the information contained in the lists. For example, a device may state aloud that user Jerry has been detected and is being authenticated instead of displaying such information.

It should be noted that display 900 of FIG. 9 is illustrative. The elements of display 900 may be oriented in any suitable manner, placed in any suitable location, and may have any suitable properties in display 900. For example, list 910 may be provided as a translucent overlay over media 930. In some embodiments, media 930 may be any suitable media content, media content listings 940 may be any suitable media content listings, advertisement 950 may be any suitable advertisement, for example, advertisement 950 may be substantially similar to advertisement 884 of FIG. 8.

Figure 10:
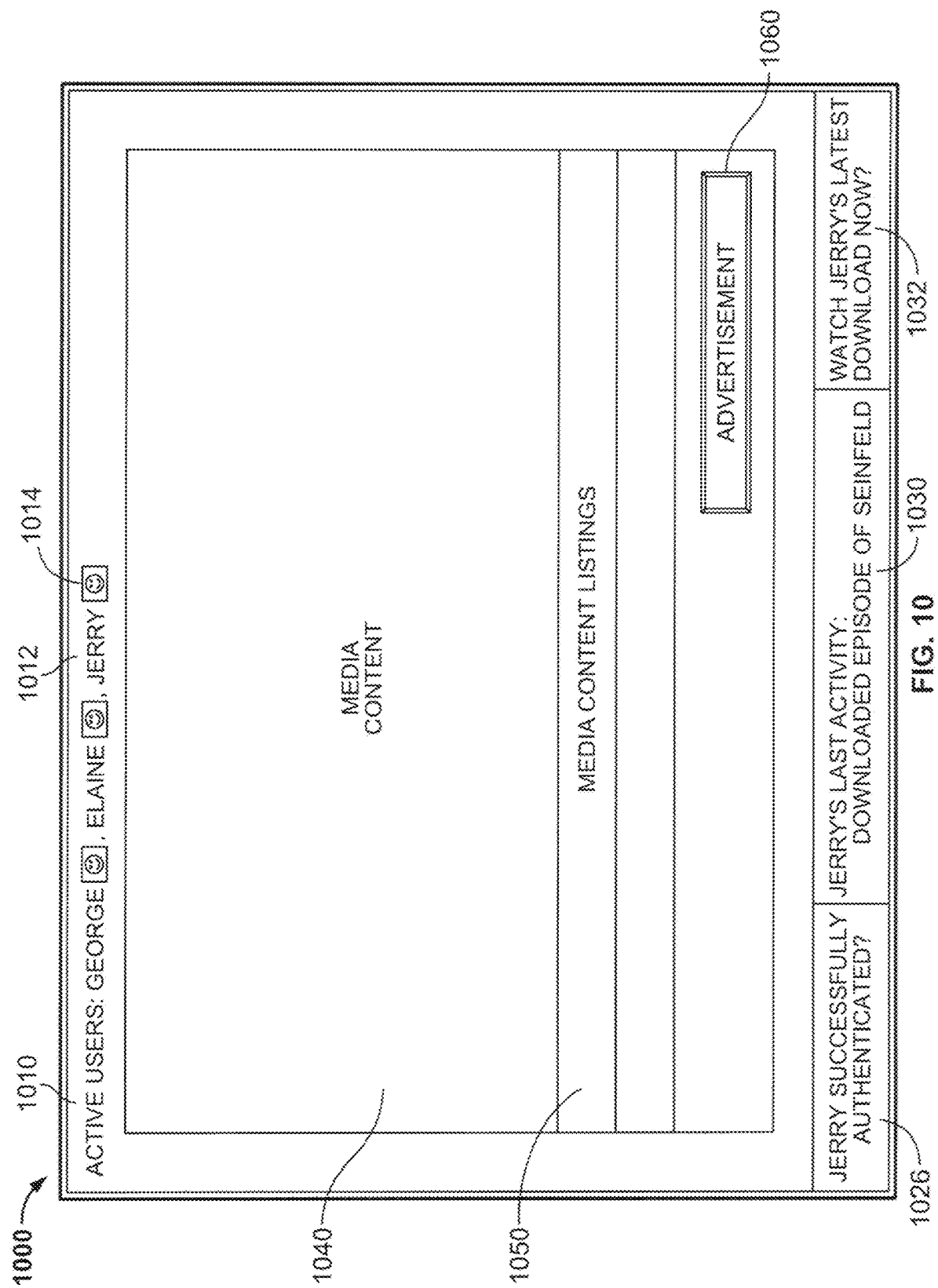
FIG. 10 is an illustrative display of options provided upon user detection at a media device in accordance with another embodiment of the invention.
Figure 11:
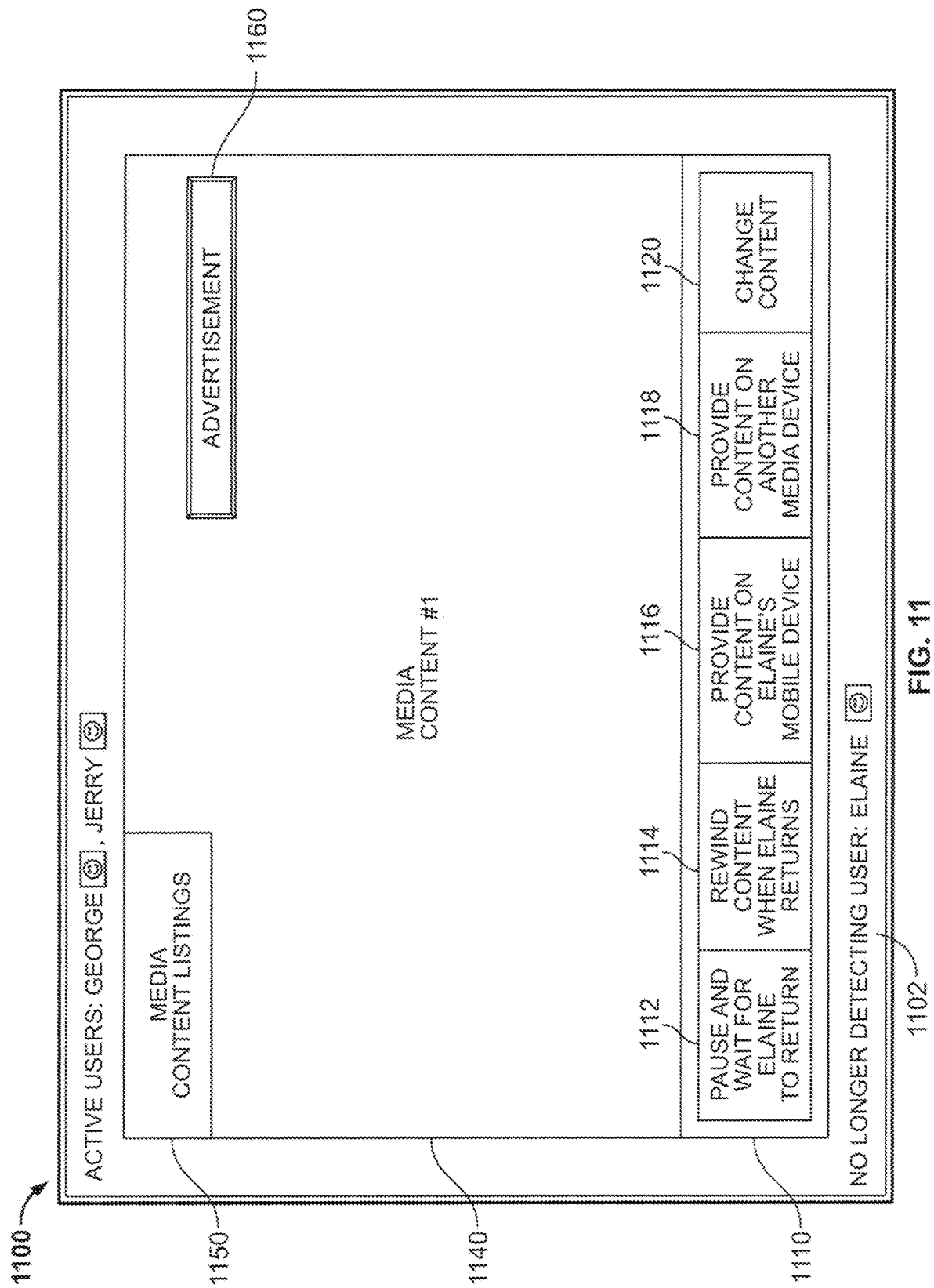
FIG. 11 is an illustrative display of options provided when a user is no longer detected at a media device in accordance with another embodiment of the invention.

After a user is successfully authenticated and/or on the list of active users at a device, the newly active user may be displayed in an active user list with the user's corresponding identification and/or picture and other currently active users, as illustrated by active user list 1010, identification 1012, and picture 1014 in display 1000 of FIG. 10. Alternatively, or additionally, the status of the user may be displayed with status 1026. For example, as illustrated in FIG. 10, status 1026 states "Jerry Successfully Authenticated!" After a user is successfully detected, identified and/or authenticated, or at any other suitable time, a device may display information associated with the newly authenticated user's last activity. For example, as illustrated in FIG. 10, last activity list 1030 may display that Jerry's last activity was to download an episode of the TV program, "Seinfeld." In some embodiments, list 1030 may display a user's last several activities. For example, list 1030 may display that Jerry also watched a video-on-demand movie before, during, or after downloading the episode of Seinfeld.

In some embodiments, users may be presented with last activity option 1032 after a user is successfully detected, identified, and/or authenticated, or at any other suitable time. By selecting option 1032, a user or users may continue the last activity the user or users performed before becoming active users at the current device. For example, as illustrated in FIG. 10, users at the device may watch Jerry's latest download. In some embodiments, option 1032 may provide access to the last several activities a user or users last performed. Alternatively, or additionally, option 1032 may not be provided, and the last activity may be automatically continued when a user is authenticated, detected, or at any other suitable time. When media content is selected to be accessed via option 1032, the accessed content may be resumed from a point in the content at which the user had previously left off, from the beginning of the content, another point substantially near the point at which the user had previously left off, or any other suitable point within the content. For example, if Jerry of FIG. 10 last viewed a movie at the device where Jerry was last active, the movie may be provided at the device Jerry newly became active, and the movie may be provided from the point within the movie that Jerry last viewed. The actions taken by the device that detected Jerry may be configured, for example, using the configuration options illustrated by FIGS. 5-8.

In some embodiments, display 1000 may include media 1040, media listings 1050, and advertisement 1060, which may be substantially similar to media 930, media listings 940, and advertisement 950 of FIG. 9, respectively.

In some embodiments, a device may provide options to active users at the device when one or more of the active users are detected to have left the detection region of the device and are therefore no longer active. For example, as illustrated in display 1100 of FIG. 11, George, Elaine, and Jerry were accessing first media content together, until Elaine left the detection region of the device. When Elaine is no longer detected by the device, status 1102 may be displayed to denote such an event. In some embodiments, status 1102 may be purely auditory instead, or in addition to, a displayed status 1102. In some embodiments, status 1102 may not be visible or audible to users and may only be accessible to system operators. When Elaine leaves the detection region of the device, the device and/or any other suitable device stores various information related to Elaine. For example, the device may store at which device she was last active (e.g., the current device), what content she was accessing, last several actions performed by Elaine, last several contents accessed by Elaine, at what point within the content she was detected to have left the device, some indicator indicating when Elaine left the device (e.g., a timestamp or a counter), or any other suitable information. The stored information may be stored, transferred, and/or copied to any other suitable device, for example, a mobile device associated with Elaine, a central server, another device near the current location, or another device at a different location.

In some embodiments, the device may provide options to remaining users when another user leaves the detection region of a device as illustrated by options window 1110. Options window 1110 may provide users with pause option 1112 which may allow the remaining active users to pause the current content and wait for the other user to return. Rewind option 1114 may also be provided which may allow the current content to continue playing uninterrupted until the user who left returns to the device, at which point the content may rewind to the point at which the user left. Mobile device relocation option 1116 may be provided to allow the content to continue playing on a mobile device. In some embodiments, the mobile device may be the mobile device of the user who left. If this option is selected, the content may continue playing on the mobile device from the current point in the content or any other suitable point within the content. Option 1118 may be provided to allow users to select to provide the content on any other media device. For example, if Elaine has gotten tired and prefers to continue access of the content from her bedroom, she may select to have to content provided at a device in her bedroom. The device in her bedroom may or may not have user detection capabilities.

If the device does have user detection capabilities, the device may automatically resume the content, or provide an option to resume the content, when Elaine is detected within that device's detection region. In some embodiments, if a user becomes active and/or resumes content on another device, the other device may send this, or other suitable information to the previously accessed device. This may allow, for example, the previously accessed device to adjust information associated with the user. For example, the device may assume the user may not return to the original device within the near future because the other user has become active at another device. Additionally, when the new device detects Elaine, that device may perform newly active user actions substantially similar to those described with regard to FIGS. 5-10.

In some embodiments, the remaining users at a device may choose to change the provided content when a user has left the detection region of the device. For example, George, Jerry, and Elaine may be watching a romance movie and Elaine leaves the detection region the device. Despite the fact that all three users were watching a romance movie together, Jerry and George may in fact be more inclined to enjoy some other content, for example, an action movie. This may be determined by Jerry and George themselves, or may be determined automatically based on any relevant information as described above with regard to merged profile options 810. In some embodiments, change media option 1120 may be provided to allow the remaining users to change provided content to another, more desirable content for the remaining users. Upon selection of option 1120, users may select recommended content that matches their profiles as described above with regard to merged profile options 810.

In some embodiments, options window 1110 may provide any other suitable option in response to detecting that a user has left the detection region of a device. In some embodiments, all or some of the options in options window 1110 may be provided and/or performed automatically. For example, provided content may automatically pause when a user is detected to have left the detection region of a device, or, for example, content may automatically change to another media content suitable for the remaining users when a user is detected to have left the detection region of a device.

In some embodiments, options window 1110 may be audible instead, or in addition to, being displayed. The options in options window 1110 may be configured, for example, using the configuration options illustrated by FIGS. 5-8. In some embodiments, display 1100 may include media 1140, media listings 1150, and advertisement 1160, which may be substantially similar to media 930, media listings 940, and advertisement 950 of FIG. 9, respectively.

In some embodiments, the user who left the detection region of the device described above with regard to FIG. 11 may return to the device within a relatively short period of time (i.e., the user's absent from the detection region was temporary, as opposed to a prolonged period of time, for example, a five-minute absence may be considered temporary, while a absence of 5 hours may be considered prolonged). This period may be determined based on information associated with the returning user that may have been stored as described above with regard to FIG. 11. The length of the period may be predetermined, and/or configured by a user or system operator using, for example, the configuration option displays described above with regard to FIGS. 5-8. If a user is absent for a period longer than the defined period, the user may be considered on a prolonged absence, which may mean that the device may take different actions when and/or if the user returns to the device, for example, the actions described above with regard FIGS. 5-10 and new users. In some embodiments, devices may take the same actions regardless of whether a user is returning to a device after a temporary absence or after a prolonged absence. In some embodiments, the actions described herein as applying to a temporarily absent user may apply to a user who was absent for a prolonged period of time instead of, or in addition to, the temporarily absent user, and vice versa.

If the user was temporarily absent and returns the actions the device may take may depend on what actions the device took when the user left the detection region of the device. For example, if content was paused when the user left (e.g., by selecting option 1112), the content may be unpaused when the user returns. If content continued running when the user left (e.g., by selecting option 1114), the content may rewind to a point substantially near the point in the content at which it was detected that the user left. If the content was provided on another device in response to the user leaving (e.g., by selecting option 1116 and/or option 1118), the content may stop being provided on the other devices. Additionally, the content on the devices may share information about the current point in the content on each device. The device to which the user returned to may rewind accordingly. For example, if the content was being provided on both the original device for George and Jerry, and another device for Elaine, however, Elaine paused the program on the other device before returning to the original device, the original device and the other device may be at a different point within the content. As such, it may be desirable for the original device to rewind the content to the earlier, or later, point at which the users were last provided the content on their respective devices.

Figure 12:
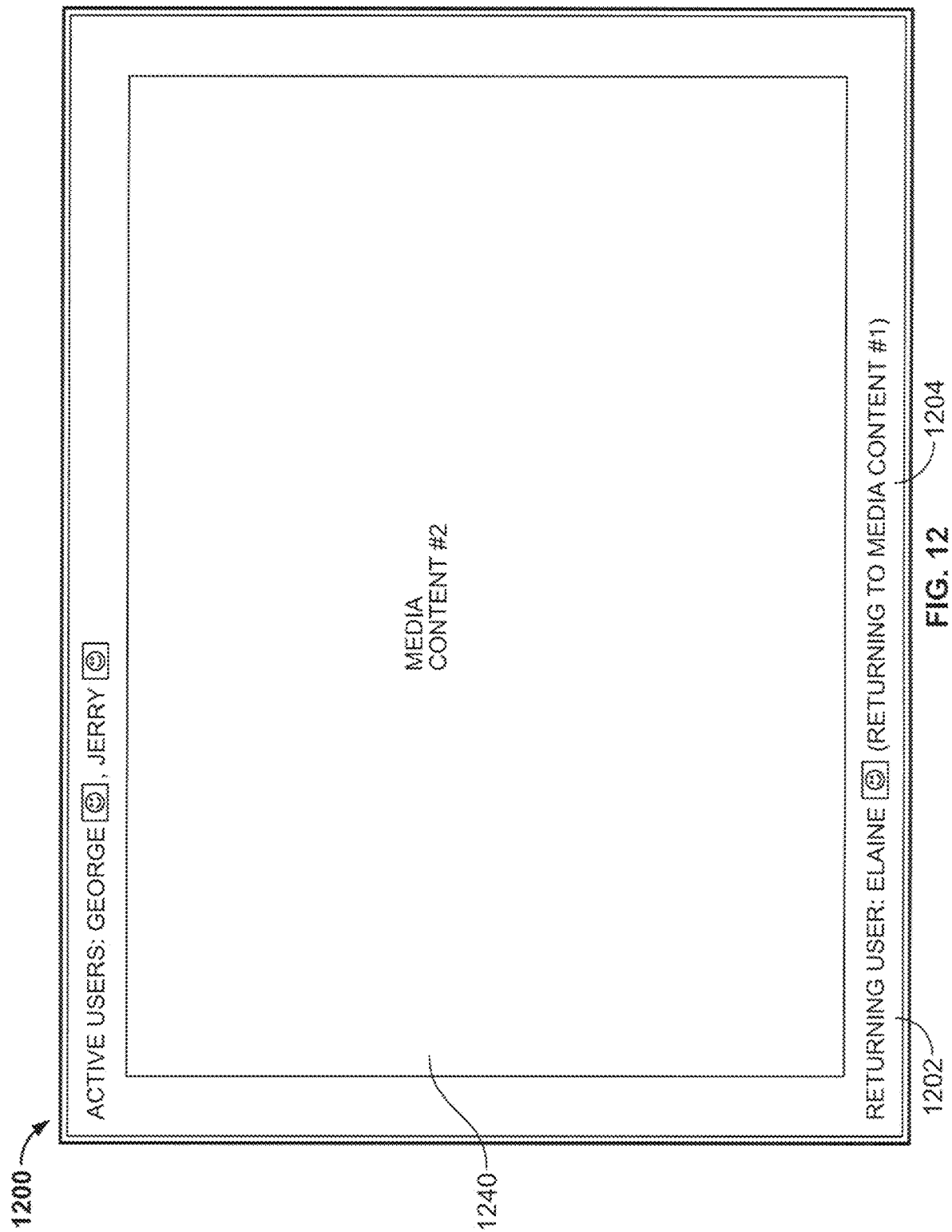
FIG. 12 is an illustrative display of active and returning users in accordance with another embodiment of the invention.
Figure 13:
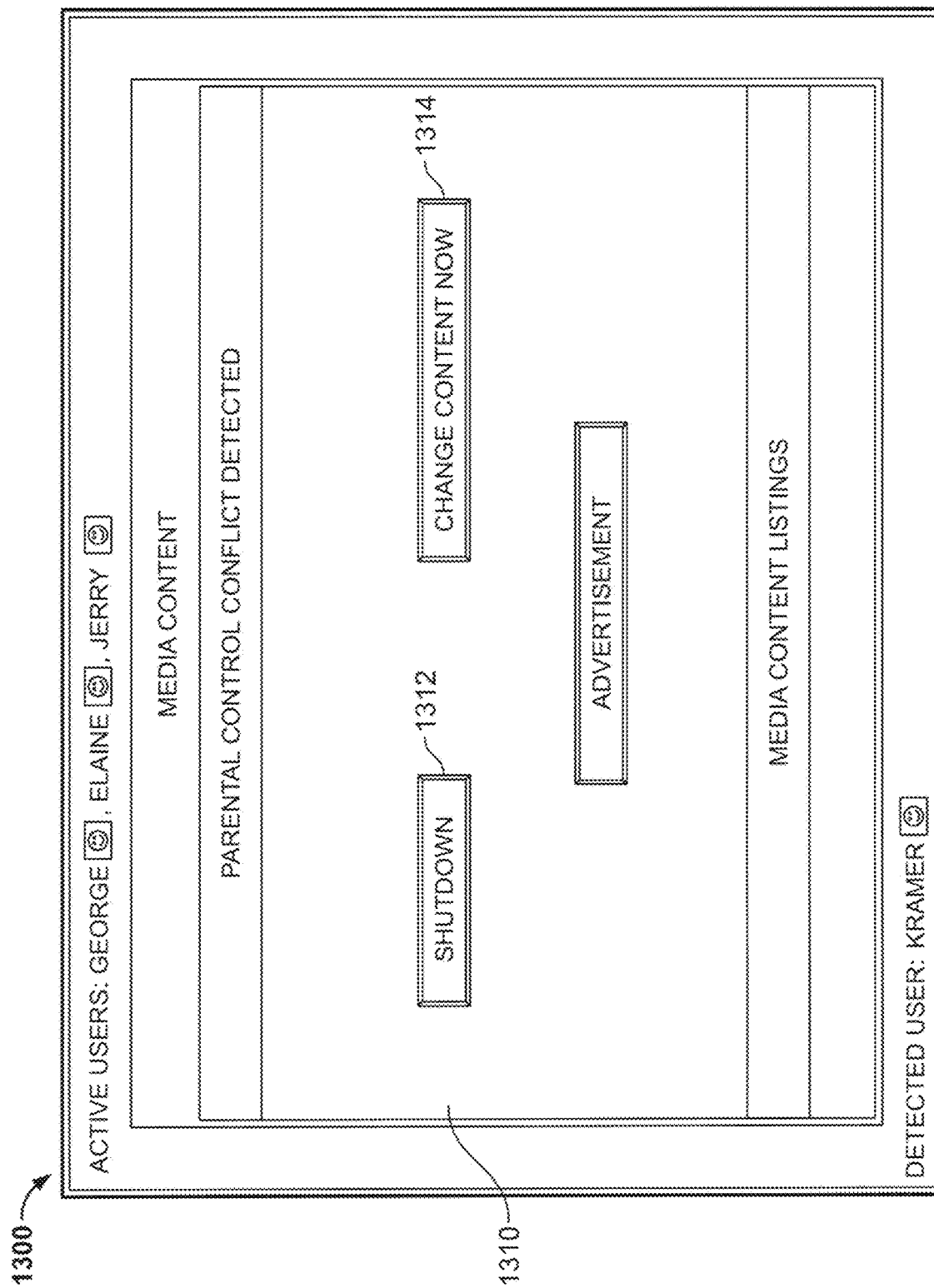
FIG. 13 is an illustrative display of options provided when a parental control conflict is detected in accordance with another embodiment of the invention.
Figure 14:
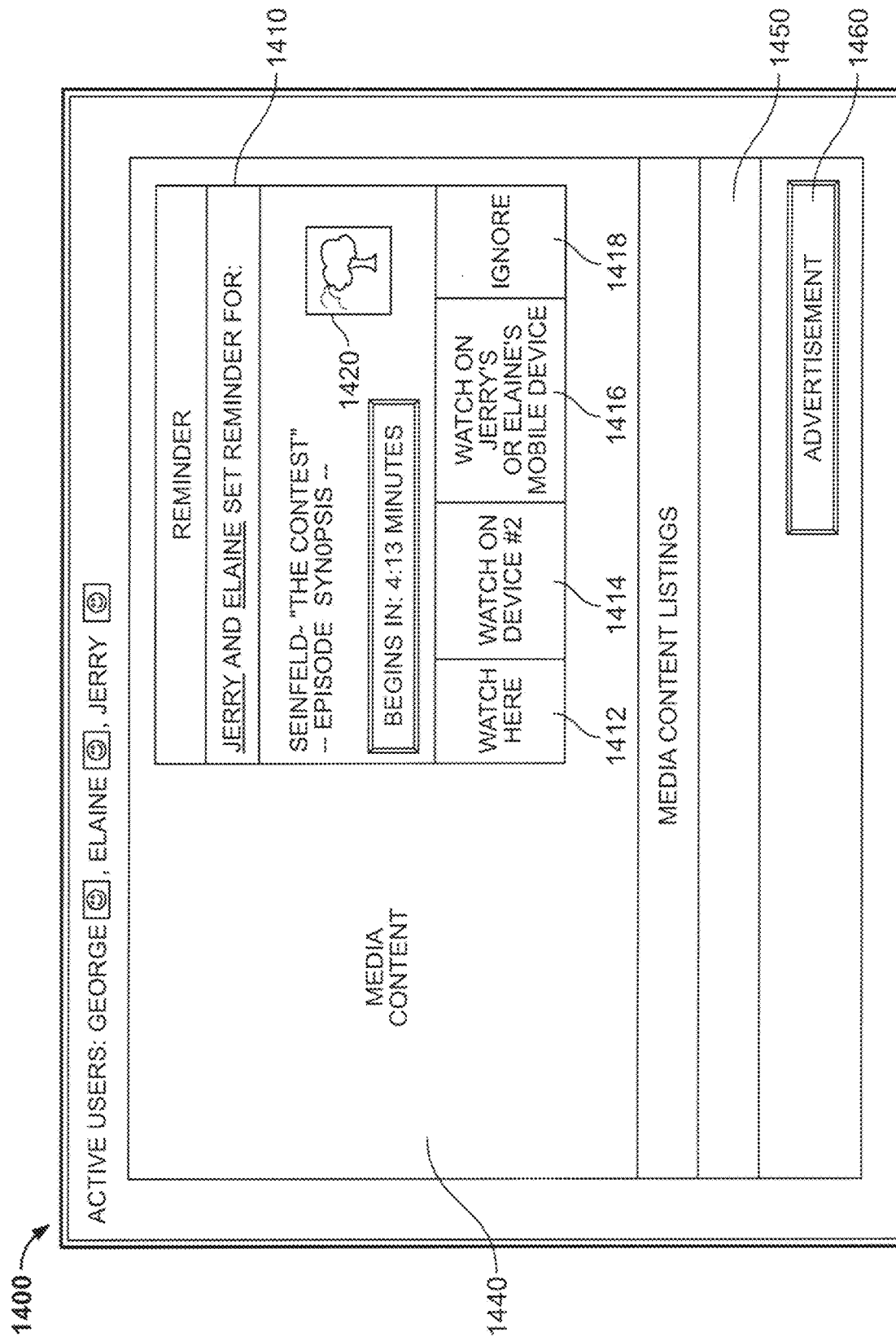
FIG. 14 is an illustrative display of a reminder for users of a media device in accordance with another embodiment of the invention.

In some embodiments, if content was changed to another content when a user left a device, for example, by selecting option 1120, the device may change the other content back to the original content when the user returns to the device, as illustrated by display 1200 of FIG. 12. For example, first media content may have been provided while George, Jerry, and Elaine were active users at a device. Then, Elaine may have become inactive, and in response, the device may provide second media content to the remaining users, George and Jerry, as described above with regard to option 1120 of FIG. 11. When Elaine returns to the device, status 1202 may indicate that Elaine is a returning user (e.g., Elaine was temporarily absent from the device). Status 1204 may indicate that the device may return to the first media content because Elaine was detected as returning. In some embodiments, the return to the first media content may occur automatically, and/or the device may provide an option to return to the first media content. In some embodiments, the device may return to a point in the first media content wherein it was detected that the user left the device, a another point substantially near the point wherein it was detected that the user left the device, or any other suitable point in the media content.

In some embodiments, a device may detect a user whose parental control settings may conflict with provided content. For example, as illustrated by display 1300 of FIG. 13, George, Elaine, and Jerry may be active users at a device which may be providing, for example, a rated "R" movie. At some point, it may be detected that another user, for example Kramer, comes within the detection region of the device. Upon detection of Kramer, the device may perform, inter alia, a parental control conflict check and subsequently discover that Kramer's parental control settings are set such that Kramer may not view movies that are rated "R". Since a rated "R" movie is being displayed on the device in the current example, a parental control conflict has been discovered. In response to the parental control conflict discovery (i.e., detecting that there is an active user who conflicts with provided content), the device may take a particular action or actions. For example, the device may display parental control conflict detected window 1310 which may provide some options. In some embodiments, window 1310 may substantially obstruct the view of the displayed content which may prevent the conflicted user (i.e., the user whose parental control settings conflict with the provided content) from viewing the conflict causing content. In some embodiments, a device may not completely or substantially obstruct the view of the displayed content because, for example, the conflicted user may be relatively far from the device providing the conflict producing content. For example, the device may dim the display of the device sufficiently to prevent the conflicted user from viewing the conflict producing content. This may allow, for example, the active users at the device who do not conflict with the content to continue to enjoy the content by not obstructing their view of the content while still preventing a conflicted user from viewing the content.

Additionally, or alternatively, the device may decrease the volume level of the device and/or mute the content to prevent the conflicted user from hearing the conflict causing content. In some embodiments, the amount the device decreases the volume level may be based on how far the conflicted user is from the device. For example, it may not be necessary to mute conflict causing content if a user is relatively far away from the device providing conflict causing content, since the conflicted user may not be able to hear the conflicted content if the volume of the content is decreased. As such, to prevent overly disturbing the use of provided content to active users, the volume of content may be decreased instead of muted based on the distance of the conflicted user to the device.

In some embodiments, the window 1310 may include option 1312 to shut down the device and/or option 1314 to change the provided content. In some embodiments, if option 1314 is selected, the device may provide recommendations for content that does not produce conflicts with any active user at the device, or alternatively, provide a complete list of the available media. For example, recommended content may include any other suitable media content and/or an edited version of the provided content that conflicts with a user. For example, the edited version may be substantially the same content as the provided content; however, profane language and/or adult content, or any other objectionable material may be edited, altered, and/or removed to produce an edited version of the provided content that may not conflict with parental controls of a user. The edited content may be stored in any suitable system and/or local device, and/or the production of the edited content may be provided in real-time. For example, a device may detect profane language in content and automatically edit the profane language out if an active user's parental control settings would conflict with the detected profane language.

If content is changed, the device, or any suitable device, may record information associated with the active users and content so that the active users which do not conflict with the content may resume access to the content from a point in the content substantially near the point in the content where the content was changed. For example, when the user that conflicts with the content is no longer detected, the originally provided content may be resumed from the point in the content where the device changed the content (e.g., when a user who conflicts with the originally provided content was detected).

In some embodiments, the content may continue to run behind window 1310 normally, muted, and/or dimmed. In such an embodiment, the content may rewind to the point at which a conflict was detected when the conflicted user is no longer detected by the device. In some embodiments, the content may be paused while behind window 1310, muted, and/or dimmed. In such an embodiment, the content may unpause when the conflicted user is no longer detected by the device.

In some embodiments, the parental control settings may provide an option that may allow user to have different parental control settings if the user is active on the same device with another particular user. For example, parents may not want their child to watch rated "R" movies, unless at least one parent is around. This may allow content to be displayed despite the content conflicting with an active user without requiring additional manual input from any user.

In some embodiments, the parental control settings may be used for privacy purposes. For example, a user may not want another user to see some content that the user is accessing. For example, a first user may want to access their financial information using a device, but does not want a second user to view their financial information. The first user may set up a control such that if they are viewing their financial information and the second user is detected, the device may perform actions similar to that of when the device detects parental control conflicts. As a practical example, the first user may view their financial information on the device. Unbeknownst to the first user, the second user comes within viewing distance of the device. The device detects the second user and determines there is a conflict between the content and the second user. In response, the device may perform actions similar to those described above with regard to parental controls.

It should be noted, that a device may perform any suitable number of the actions described above with regard to parental and privacy controls. Additionally, the actions performed may be automatic and/or the device may provide options to active the actions in any suitable fashion. The aforementioned and/or any other suitable parental and privacy controls may be activated in response to any suitable user detection. For example, the controls may be activated whether or not a conflicted user is authorized on the device, whether or not a conflicted user is within the device's detection region, or in any other suitable manner. For example, the controls may be activated in response to detecting a user regardless of whether the user has been identified and/or authorized. The actions performed and how they are performed may be configured using the configuration screens as described above with regard to FIGS. 5-8.

In some embodiments, one or more users active on a device may have configured a reminder associated with them to trigger at a particular time. This reminder may be displayed at the appropriate time at a device even if there are other active users at the device, as illustrated by display 1400 of FIG. 14. For example, reminder window may be displayed when the reminder is triggered for Jerry and Elaine. In this example, George has not set up a reminder for the same content, and therefore, may not be interested in viewing the content. As such, it may be desirable to provide options that may allow the active users to decide whether or not they will access the reminded content, and if so, where will they access it. For example, they may choose to access the content at the current device by selecting watch here option 1412. They may choose to access the content at different devices by selecting watch on a different device option 1414 and/or selecting watch on a mobile device option 1416. In some embodiments, the users may choose to ignore the reminder by selecting ignore option 1418. In some embodiments, some or all of these options may occur automatically instead of, or in addition to, being provided as selectable options.

In some embodiments, reminder window 1410 may be audible instead, or in addition to, being displayed. The options in reminder window 1410 may be configured, for example, using the configuration options as illustrated by FIGS. 5-8. In some embodiments, display 1400 may include media 1440, media listings 1450, and advertisement 1460, which may be substantially similar to media 930, media listings 940, and advertisement 950 of FIG. 9, respectively.

Figure 15:
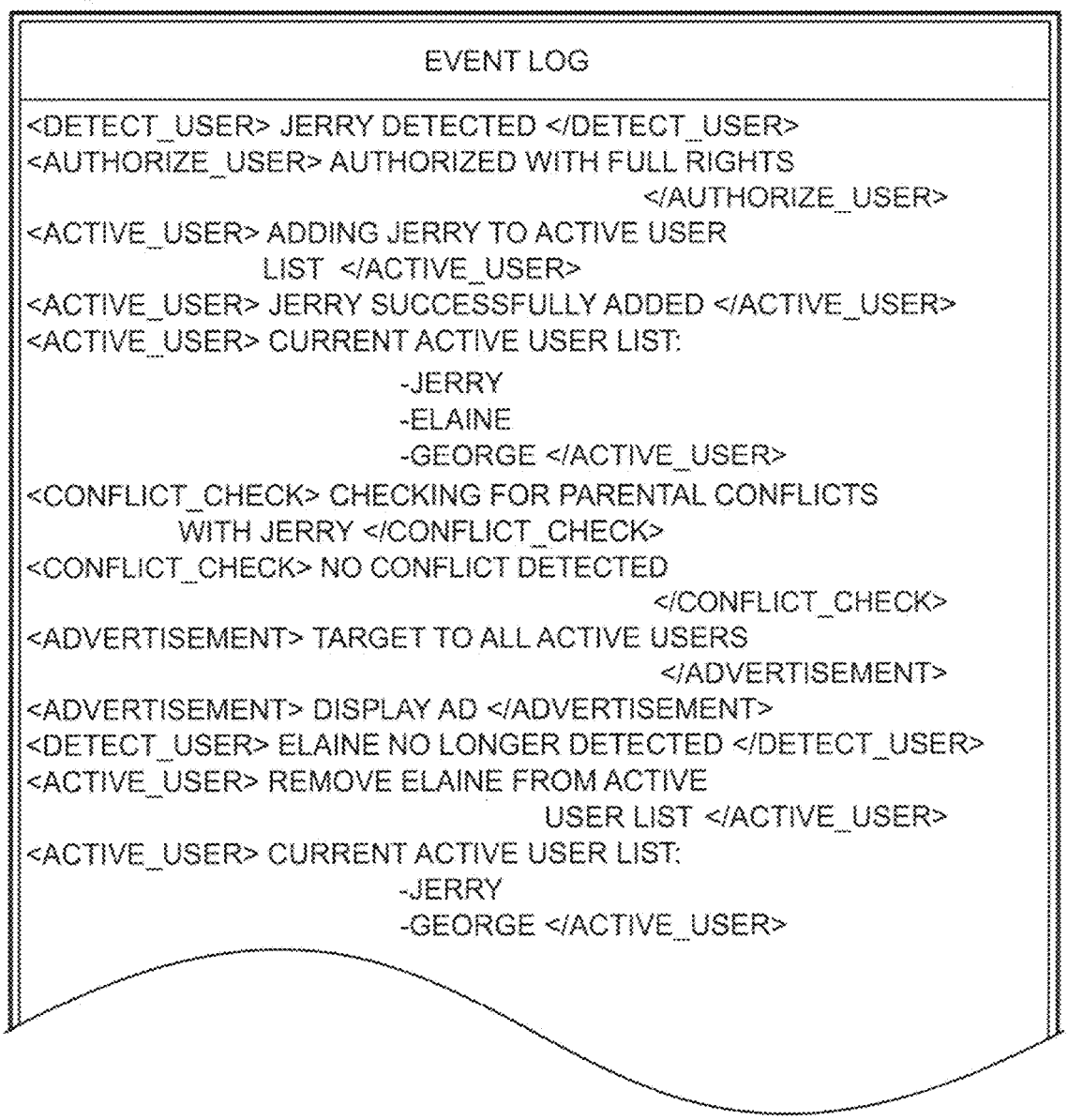
FIG. 15 shows an exemplary event log for a media device in accordance with another embodiment of the invention.

In some embodiments, an event log, for example event log 1500 of FIG. 15 may be created and/or maintained at any suitable user device, or any suitable system device, or any other suitable device, for example, media guidance data source 418 of FIG. 4. Event log 1500 may store any suitable data regarding the use, activation, and/or actions preformed at and/or by a device or devices. For example, event log 1500 may include who may be active at a particular device at a given time, when they were detected by the device, when they were detected to leave a device, event targeting operations, any other event and/or action described herein, or any other suitable event and/or action. Event log 1500 may be used for debugging purposes (e.g., if an error occurs during activation of an action), or may be used to determine, for example, where a user was last active and what content that user last accessed. Such information may be useful when the user returns to that device or moves to another device to determine what actions the respective devices may perform upon detection of the user, for example, to continue access of media content at one device that was previously accessed at another device, as described herein.

Figure 16:
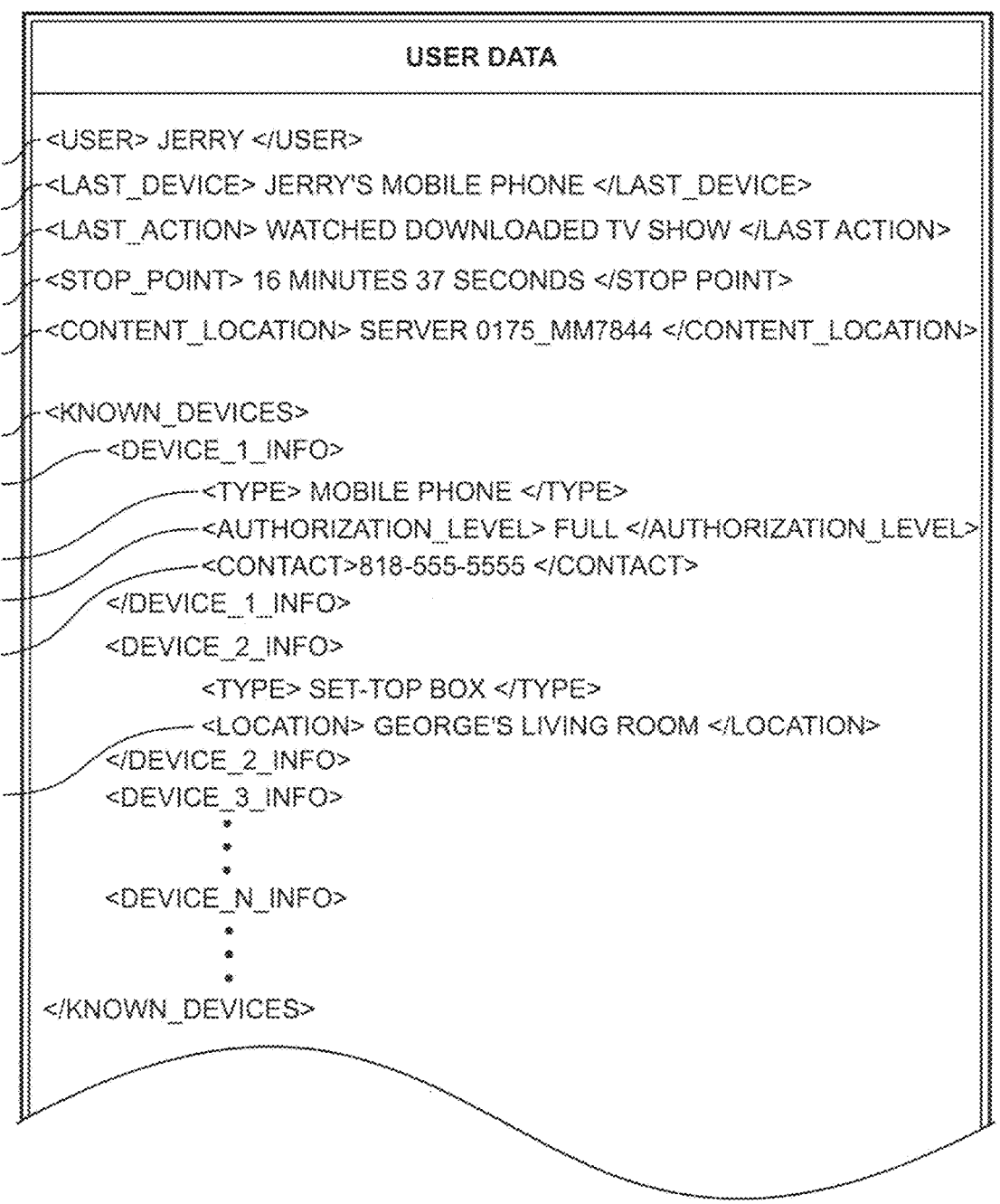
FIG. 16 shows an exemplary user data structure in accordance with another embodiment of the invention.

In some embodiments, user data 1600 of FIG. 16 may be created and/or maintained to provide information associated with a user. User data 1600 may contain various fields that identify the user or users to which user data 1600 is associated. For example, user data 1600 may include user field 1610, last device field 1612, last action field 1614, stop point field 1616, media location filed 1618, and known devices field 1620. User data 1600 may be created, stored, and/or maintained in any suitable location at any suitable device, for example, on user devices and/or system operator devices, such as, a server. In some embodiments, user data 1600 may be transferred to and/or from any device to any suitable device. For example, when a user approaches a new device, user data 1600 may be copied from a mobile device associated with the user to the new device. This may provide the new device any suitable information pertaining to the associated user, for example, the user's previous activities, age, last location, or any other data provided for in user data 1600.

User field 1610 may include the user or users for which user data 1600 is associated. The user may be identified by name, user identification, or any other suitable identification method. Last device field 1612 may include the last and/or recent device or devices used by the user or users, for example, field 1612 may list the last device at which the user accessed media content. Last action field 1614 may include the last action or actions performed by the user or users. Field 1614 may provided information pertaining to any suitable user action, for example, downloading content, watching content, pausing content, rewinding content, fast forwarding content, setting reminders, recording, surfing the internet, getting detailed information about content, configuring devices, or any other suitable user action. If the user last accessed content, stop point field 1616 may be provided in user data 1600 to provide information regarding the point in the content at which the user last accessed the content. For example, if the user last watched a movie, but stopped 16 minutes and 37 seconds into the movie, stop point field 1616 may include that time. This information may be used by a device to resume the content from the point at which the content was last accessed when the user becomes active at the device.

In some embodiments, media content may be stored in any suitable location, for example, user devices and/or system devices. In such embodiments, user data 1600 may include content location field 1618 which may provide information pertaining to the storage location of, for example, content last accessed by the user. This may, for example, be useful when a device attempts to resume the content when, for example, the content is not locally stored on the device.

In some embodiments, user data 1600 may contain information pertaining to a device or devices that are known to the associated user or users in, for example, known device field 1620. Devices in known device field 1620 may include devices at which the associated user was active, devices detected by another user device associated with the user, devices that detected the user, devices manually entered into user data 1600 by any suitable user or system operator, or any other suitable device. Known device field 1620 may additionally contain information pertaining to the known devices themselves in device information field 1622. Device information field 1622 may include device type field 1624, authorization level 1626, contact information field 1628, device location field 1630, or any other suitable field that describe a device's characteristics.

Device type field 1624 may contain information pertaining to what type of device is the device. For example, the device may be a mobile, set-top box, or any other suitable device as described above with regard to FIGS. 3 and 4. Authorization level 1626 may contain information regarding the associated user or users level of authorized access to the device. For example, the user may have full access at a particular device, may be blocked from a device, or may not be authorized at a device, or any other suitable access level as described above with regard to FIG. 7. In some embodiments, devices may have contact information associated with them. Contact information field 1628 may contain the contact information so that users and/or devices may contact the listed device. For example, contact information field 1628 may include a phone number, IP address, MAC address, available ports, accepted communication protocols, or any other suitable information required to contact the device in any suitable manner. Device location field 1630 may be included in device information field 1622 to provide information pertaining to the device's location. For example, a device may be in any suitable location, for example, a room in a user's household. In some embodiments, device may be mobile. In such embodiments, device location field

1630 may state simply that the device is mobile, or alternatively, or additionally, field 1630 may state the device's last known whereabouts or current location. Current location may include, for example, longitude/latitude coordinates, location with respect to another device, household, street location, city, state, country, or any other suitable connotation of location.

Figure 17:
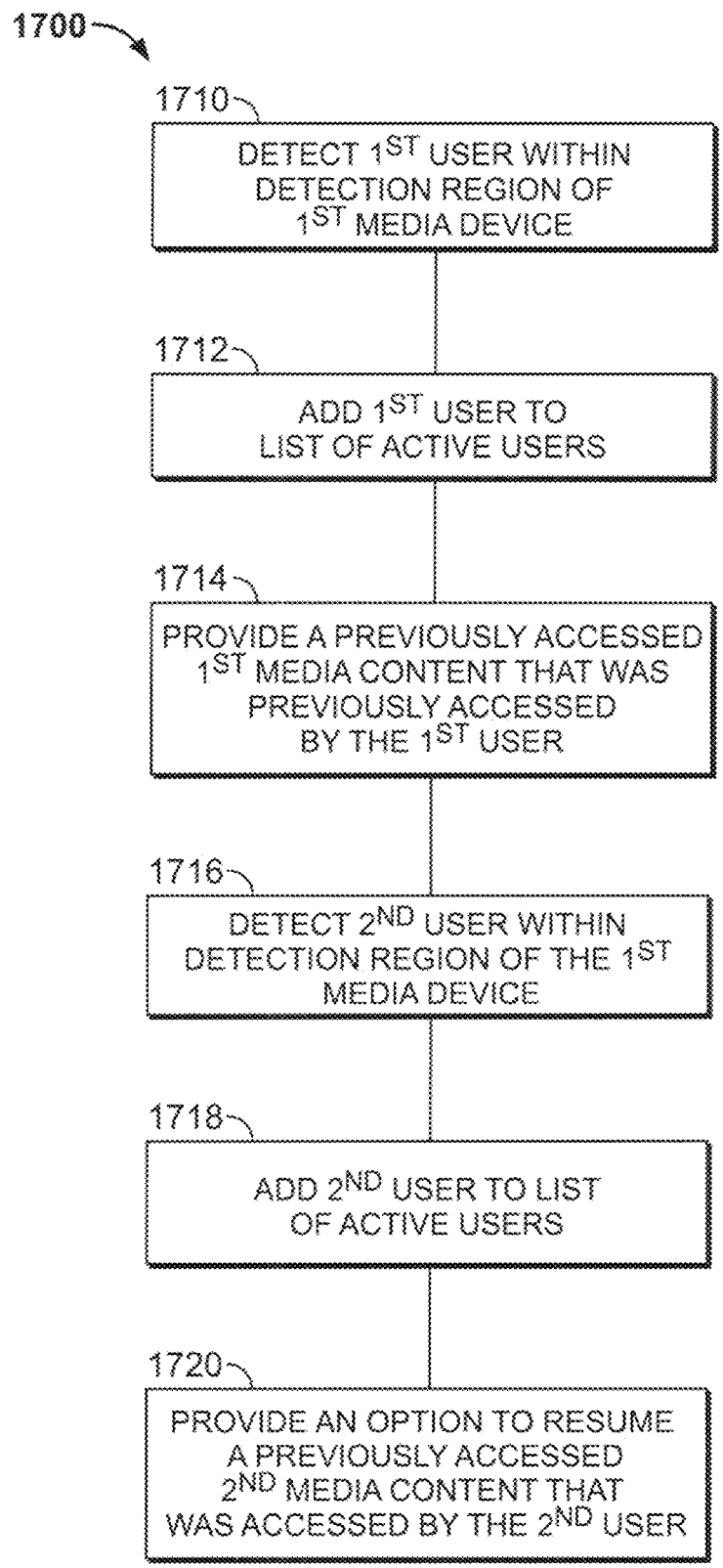
FIG. 17 is an illustrative process for detecting users in accordance with another embodiment of the invention.

FIG. 17 shows illustrative process 1700 for detecting a user or users in accordance with some embodiments of the present invention. At step 1710 a first user is within the detection region of a first media device. In some embodiments, the user may be detected by the first media device, or any other suitable device, but not be within the detection region of the first device, as discussed above. At step 1712, if the user is within the device's detection region, the user is added to a list of active users at the first media device, as discussed above. For example, the user may be added to the list of active users that may be stored in storage 308 and/or user input interface 310 of FIG. 3. This may include authenticating the user and/or logging the user into the device, or any suitable combination thereof using, for example, processing circuitry 306 of FIG. 3. In some embodiments, the user may be added to the list of active users if the user is detected and/or identified, but not within the detection region of the first device. At step 1714, previously accessed media content is provided on, for example, display 312 of FIG. 3. The media content may have been accessed previously by the first user at the current device or any other suitable device, as discussed above. Further, the media content may be provided at any suitable point within the content, for example, from the point last accessed by the user, as described above.

At step 1716, a second user is detected within the detection region of the first media device. At step 1718, the second user is also be added to the list of active user, for example, when the second user is within the detection region of the media device. At step 1720, an option is provided to resume previously accessed second media content that was accessed by the second user, for example, at another device or any other device, as discussed above. The actions taken by the device may be automatic and/or configured as described above. For example, a previously accessed media content may automatically resume instead of, or in addition to, the option provided in, for example, step 1720.

In practice, one or more steps shown in process 1700 may be combined with other step, performed in any suitable order, performed in parallel (e.g., simultaneously or substantially simultaneously), or removed. For example, the first and second users of step 1710 and step 1716, respectively, may be detected within the detection region at the same time.

Figure 18:
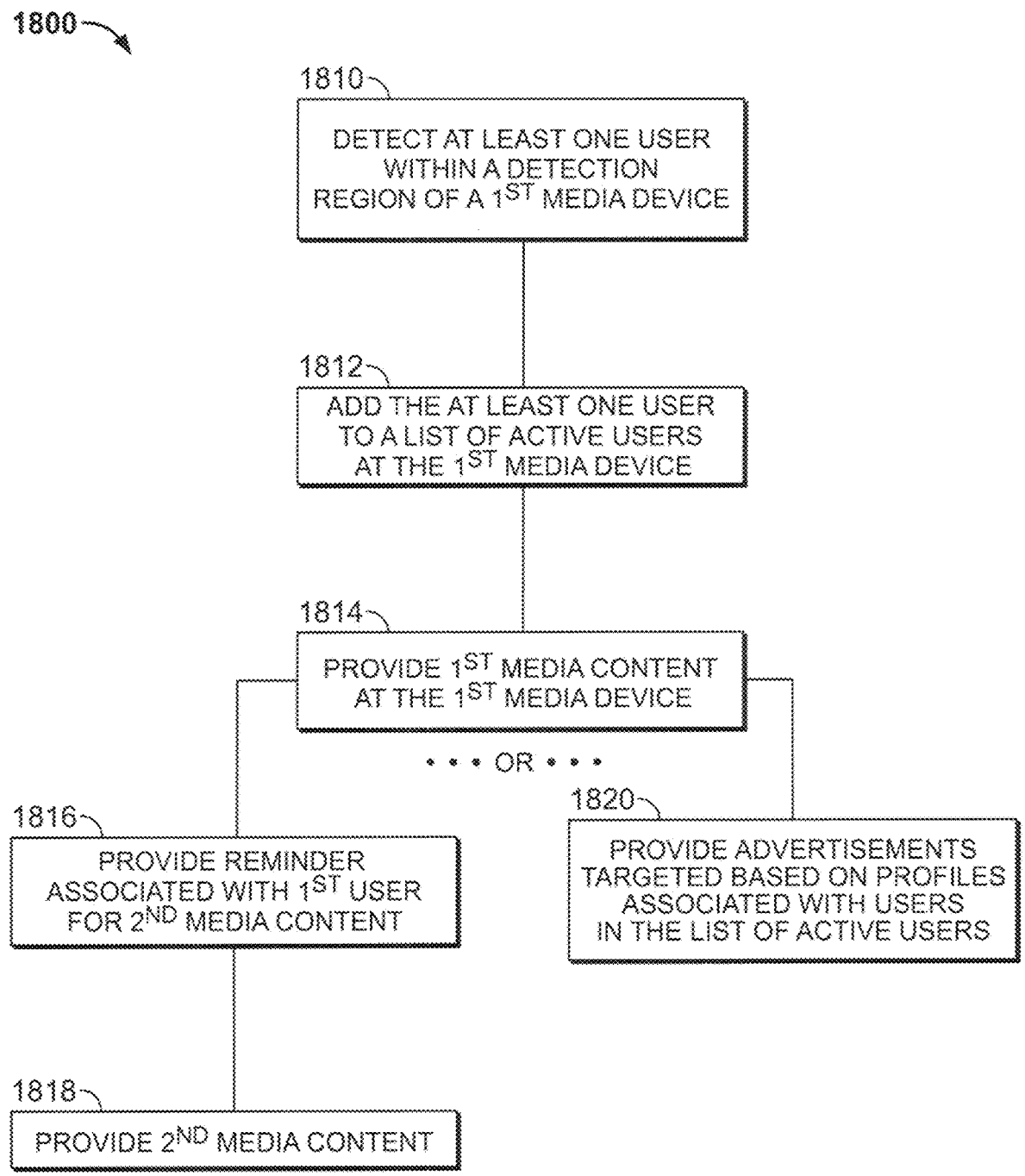
FIG. 18 is an illustrative process for supporting actions a device may make after detection of users in accordance with another embodiment of the invention.

FIG. 18 shows illustrative process 1800 for supporting actions a device may take after detection of a user or users in accordance with some embodiments of the present invention. At step 1810 a user or users is detected within the detection region of a first media device as discussed in connection with step 1710 and step 1716 of FIG. 17. At step 1812, the users are added to a list of active users at the first media device as discussed in connection with step 1712 and step 1718 of FIG. 17. At step 1814, first media content is provided at the first media device. The media content may be any suitable media content, for example, as discussed above in connection with step 1714 and/or step 1720 of FIG. 17, the media content may be content previously accessed by one or more of the active users at the device. In some embodiments, reminders may be provided which are associated with one or more of the active users at a device. For example, as illustrated by step 1816, a reminder associated with the first user for second media content is provided. The reminder may be provided as described in connection with reminder window 1410 of FIG. 14. The second media content is provided at step 1818 if, for example, the users request access to the second media content in response to viewing the reminder. In some embodiments, the second media may be provided automatically. As discussed in connection with FIG. 14, the reminded content may be provided, for example, at any suitable device.

In addition, or alternatively to the provided reminders of step 1816, at step 1820, advertisements are provided based on profiles associated with user in the list of active users. For example, the advertisements may be targeted to the active users at the device as discussed above in connection with FIG. 8.

In practice, one or more steps shown in process 1800 may be combined with other steps, performed in any suitable order, performed in parallel (e.g., simultaneously or substantially simultaneously), or removed. For example, the reminder provided at step 1816 may be provided substantially simultaneously with the advertisement provided at step 1820.

Figure 19:
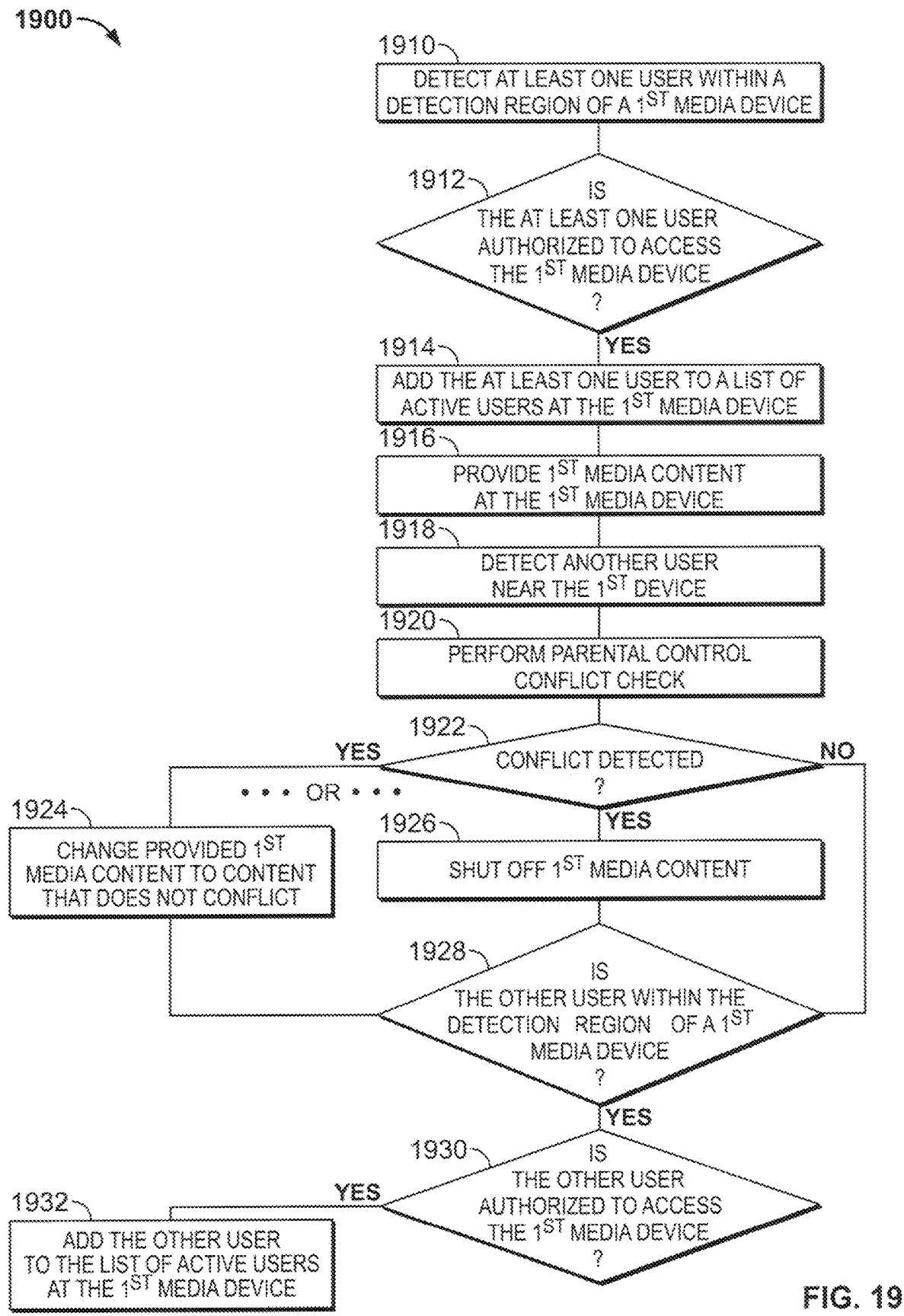
FIG. 19 is an illustrative process for supporting actions a device may make after performing a parental control conflict check in accordance with another embodiment of the invention.

FIG. 19 shows illustrative process 1900 for supporting actions a device may take in regards to parental control conflict check in accordance with some embodiments of the present invention. At step 1910, at least one user is detected within the detection region of a first media device. The detection process, detection region, and media device may be similar to the detection process, detection region, and media device discussed above in connection with FIG. 17. After detecting that at least one user has entered the detection region, the process may proceed to step 1912, where it is determined whether the at least one user is authorized to access the first media device. The authorization determination may be similar to the determination discussed in connection with authorization setting of FIG. 7. If the at least one user is authorized, the at least one user is added to the list of active users at the first media device at step 1914, as described above in connection with FIG. 17.

At step 1916, first media content is provided at the first media device. The media content may be any suitable media content, for example, as discussed above in connection with step 1714 and/or step 1720 of FIG. 17, the media content may be content previously accessed by one or more of the active users at the device. At step 1918, another user is detected near the first user device. In some embodiments, the user may be within the detection region or, alternatively, the use may just be within a detectable range to the media device. At step 1920, a parental control conflict check is performed on the newly detected user. The conflict check may performed as discussed above in connection with upon detection menu 830 of FIG. 8 and parental control conflict detected window 1310 of FIG. 13, for example, the conflict check may compare characteristics of the provided media with parental control settings of the newly detected user. The conflict check may be performed using, for example, circuitry 306 of FIG. 3. At step 1922, it is determined whether or not a parental control conflict was detected during the conflict check performed at step 1920. If there is a conflict, the device may take any suitable action, for example, the actions described by step 1924 or step 1926. At step 1924, the device changes the provided first media content to another media content that does not conflict with, for example, any of the active users and/or the newly detected user.

Alternately, or additionally, the device may proceed to step 1926 and shut off the first media content in response to determining that a conflict does exist. Shutting off the media content may include, for example, removing the content from the display and/or halting access to the content. In some embodiments, the media device may continue to access the content, but not provide any indication that the device is accessing the content. This may allow, for example, the device to record a broadcasted program, or any other suitable media content, while the program is removed from the device's display for user conflict purposes. This may allow users who do not conflict with the program to continue watching the broadcasted program without any discontinuity (e.g., continue watching the program from the point at which display was removed) once the user who conflicts with the program is no longer detected. The process of step 1924 and step 1926 may be substantially similar as described above in connection with menu 830 of FIG. 8 and window 1310 of FIG. 13.

After any parental control conflicts are resolved, it is be determined whether the newly detected user is with the detection region of the first media device at step 1928, as described above in connection with step 1910. If the user is within the detection region, it is determined whether the user is authorized to access the first media device at step 1930, as described above in connection with step 1912. At step 1932, the newly detected user is added to the list of active users at the first media device if the user is authorized to access the first media device.

In practice, one or more steps shown in process 1900 may be combined with other steps, performed in any suitable order, performed in parallel (e.g., simultaneously or substantially simultaneously), or removed. For example, the parental control conflict check of step 1920 may additionally be performed when the at least one user of step 1910 is detected.

Figure 20:
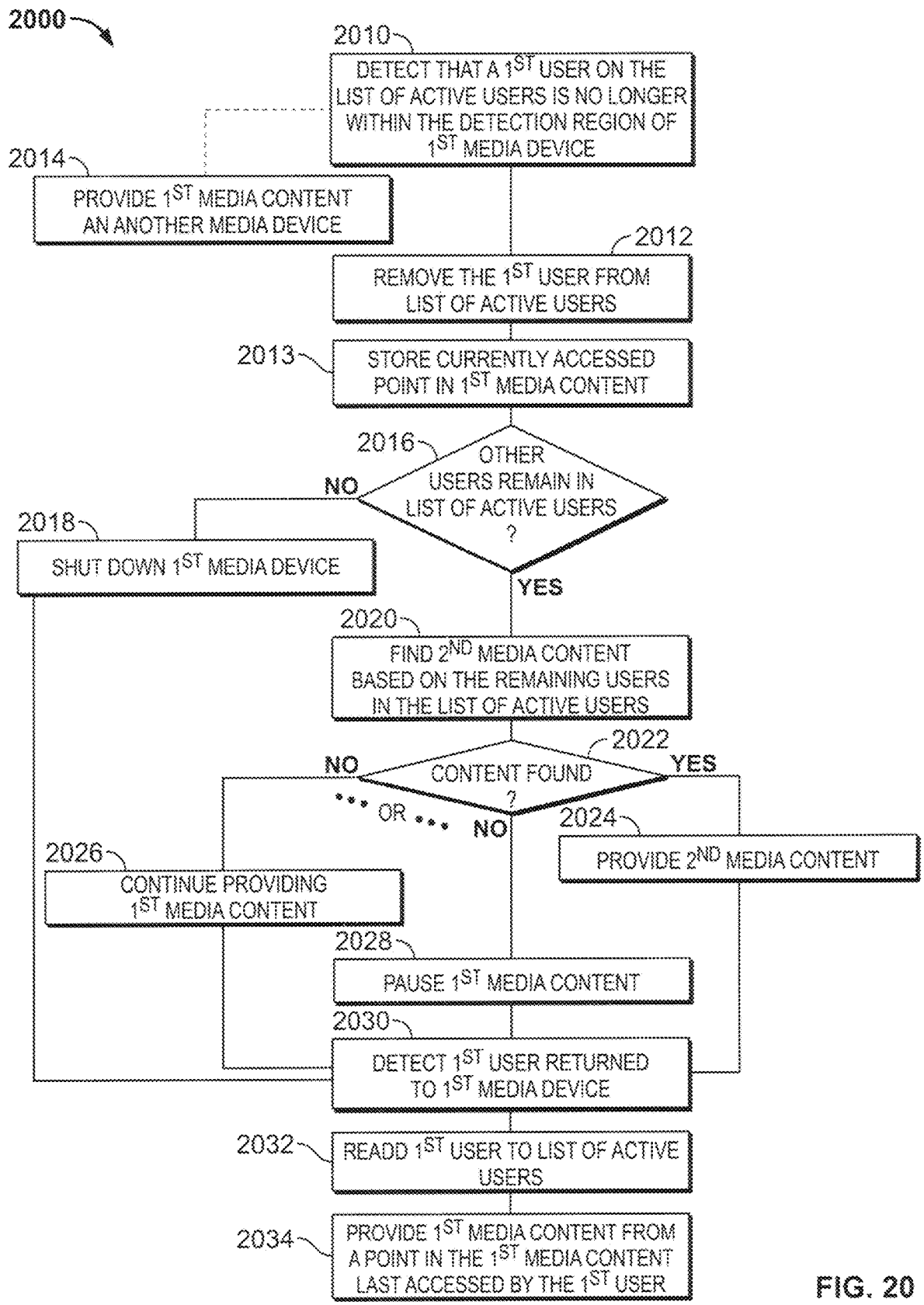
FIG. 20 is an illustrative process for supporting actions a device may make when a user is no longer within the detection region of a device in accordance with another embodiment of the invention.

FIG. 20 shows illustrative process 2000 for supporting actions a device may take when a user is detected to no longer be within the detection region of a device in accordance with some embodiments of the present invention. At step 2010, a first user on the list of active users at first device is detected to have left the detection region of the first media device. The user may be detected to no longer be within the detection region of the device as described above in connection with leaving user options 840 of FIG. 8 and options window 1110 of FIG. 11. At step 2012, the user is removed from the list of active users upon detection that the user is no longer within the detection region of the device. The removal of the user from the list of active users may be performed as discussed in connection with FIG. 8 and FIG. 11. At step 2013, the point in the first media content being currently accessed is stored in, for example, storage 308, user input interface 310 of FIG. 3, and/or any other suitable user and/or system device. This may allow the first media device or any other device to reaccess the first media content from the point at, or substantially the same point, at which the first user last accessed the first media content. In some embodiments, if a first media content was being provided prior to the first user leaving the first media device, the first media content may be provided on another media device at step 2014, for example, as described above in connection with leaving user options 840 of FIG. 8 and options window 1110 of FIG. 11. For example, the first media content may be provided on a mobile phone associated with the first user.

At step 2016, it is determined whether there are other users who remain on the list of active users at the device. The determination may be completed by, for example, processing circuitry 306 of FIG. 3. If users remain on the list of active users after the first user is removed from the list, it may be assumed that those users are still accessing the first media content at the device. Otherwise, if there are no users who remain on the list, it may be assumed that there are no users still accessing the first media content at the device. As such, if there no other users who remain at the device, it may not be necessary to leave the device active. In such embodiments, the process may proceed to step 2018, where the first media device is shutdown. The first media device may be shutdown as described above in connection with FIG. 8 and FIG. 11.

If users do remain at the first media device, the process may proceed to step 2020, where second media content is found. The second media content may be based on the remaining users in the list of active users, for example, as described above in connection with options 840 of FIG. 8 and options window 1110 of FIG. 11. The second media may be located in, for example, storage 308 of FIG. 3 and/or media content source 416 of FIG. 4. At step 2022, it is determined whether suitable second media content was found. If so, the process may proceed to step 2024 to provide the found second media content.

Alternatively, (e.g., if no other suitable content is found) the process may proceed to step 2026 and/or step 2028. At step 2026, the device continues to provide the first media content. In this scenario, the users at the device may not notice any disruption in their access of the first media content between a time before the first user left the device and a time after the first user left the device. At step 2028, the first media is paused in response to the first user leaving the detection region, for example, in anticipation that the first user may return to the device.

At step 2030, the first user is detected to have returned to the first media device. The detection may be performed as discussed above in connection with step 1710 and step 1716 of FIG. 17. After the detecting the returned first user, the process may proceed to step 2032, where the first user is readded to the list of active users at the first media device. The readding of the first user may be performed as described above in connection with FIGS. 8 and 17. At step 2034, the first media content is provided from a point in the first media at which the first user was removed from the list of active users. For example, if the first media content continued to be accessed when the first user left the first media device, as described in connection with step 2026, the first media content may be rewound to the point, or substantially near the point, at which the first user was removed from the list of active users. If the first media was paused when the first user left the media device, as described in connection with step 2028, the first media content may be unpaused. If second media content was provided when the first user left the first media device, the first media content may be provided again from the point at which the first user was removed from the list of active users. In some embodiments, the first media may be accessed from the point at which the first media content was last accessed by the first users. For example, if the first media content was provided on another media device, as described in connection with step 2014, the first user may have continued to access the media content on the other device beyond the point in the media content at which the first user was removed from the list of active users while, for example, the users who remain at the first media device continue to concurrently access the first media content. Thus, in such a situation it may be desirable to provide the first media content from a point in the first media content last accessed by the first user. In some embodiments, the first media content may be provided upon the return of the first user to the first media device in any suitable manner, for example, as discussed above in connection with options 850 of FIG. 8 and FIG. 12.

In practice, one or more steps shown in process 2000 may be combined with other steps, performed in any suitable order, performed in parallel (e.g., simultaneously or substantially simultaneously), or removed. For example, the first media content may be provided on another media device as described above in connection with step 2014, while substantially simultaneously second media content may be provided on the first media device as described above in connection with step 2024.

The above described embodiments of the present invention are presented for purposes of illustration and not of limitation, and the present invention is limited only by the claims which follow.

What is claimed is:

1. A method for providing reminders to users of a media device, the method comprising:
   receiving a reminder for a first media content associated with a first user;
   detecting a plurality of users within a detection region that is associated with the media device;
   determining that each of the plurality of users is active at the media device;
   providing a second media content on the media device;
   determining that the reminder for the first media content is also associated with a second user of the plurality of users; and
      in response to determining that the reminder for the first media content is also associated with the second user, generating for display on the media device the reminder.

2. The method of claim 1, further comprising:
   determining that the media device has a detection mechanism, wherein the detection mechanism is operable to detect a user within a first detectable range relative to the media device; and
   setting the detection region associated with the media device as a region within the first detectable range.

3. The method of claim 1, wherein determining that each of the plurality of users is active at the media device comprises, for each respective user:
   identifying the respective user;
   determining, based on the identification, whether the respective user is known by the media device; and
   in response to determining that the respective user is known by the media device, automatically performing an authentication procedure for the respective user at the media device.

4. The method of claim 1, further comprising:
   comparing properties of the first media content with preferences associated with the plurality of users;
   determining a probability that each of the plurality of users would enjoy the first media content;
   providing an indication that at least one of the plurality of users would not enjoy the first media content when it is determined that there is a sufficient probability that the at least one of the plurality of users would not enjoy the first media content; and
   providing an indication that at least one of the plurality of users would enjoy the first media content when it is determined that there is a sufficient probability that the at least one of the plurality of users would enjoy the first media content.

5. The method of claim 1, further comprising:
   comparing properties of the first media content with preferences associated with the plurality of users; and
   providing the reminder only when the properties of the first media content do not conflict with the preferences associated with the plurality of users.

6. The method of claim 1, further comprising:
   providing an option to access the first media content on a different media device associated with at least one of the first user and the second user.

7. The method of claim 1, further comprising:
   providing an option to access the first media content on a different media device, wherein at least one of the plurality of users is detected within a detectable range relative to the different media device, but outside of a different detection region that is associated with the different media device.

8. The method of claim 1, wherein the reminder is only provided when the first user and the second user are associated with an appropriate group.

9. The method of claim 1, wherein the reminder was previously set by at least one of the first user and the second user.

10. The method of claim 1, wherein the reminder was automatically set by a service provider upon a determination of a probability that at least one of the first user and the second user would be interested in the first media content.

11. A system for providing reminders to users of a media device, the system comprising:
    input circuitry configured to receive a reminder for a first media content associated with a first user;
    a detection mechanism operable to detect a user within a first detectable range relative to the media device; and
    control circuitry configured to:
       detect a plurality of users within a detection region that is associated with the media device;
       determine that each of the plurality of users is active at the media device;
       provide a second media content on the media device;
       determine that the reminder for the first media content is also associated with a second user of the plurality of users; and
       in response to determining that the reminder for the first media content is also associated with the second user, generate for display on the media device the reminder.

12. The system of claim 11, wherein the control circuitry is further configured to:
    set the detection region associated with the media device as a region within the first detectable range.

13. The system of claim 11, wherein the control circuitry configured to determine that each of the plurality of users is active at the media device is further configured to, for each respective user:
    identify the respective user;
    determine, based on the identification, whether the respective user is known by the media device; and
    in response to determining that the respective user is known by the media device, automatically perform an authentication procedure for the respective user at the media device.

14. The system of claim 11, wherein the control circuitry is further configured to:
    compare properties of the first media content with preferences associated with the plurality of users;
    determine a probability that each of the plurality of users would enjoy the first media content;

provide an indication that at least one of the plurality of users would not enjoy the first media content when it is determined that there is a sufficient probability that the at least one of the plurality of users would not enjoy the first media content; and provide an indication that at least one of the plurality of users would enjoy the first media content when it is determined that there is a sufficient probability that the at least one of the plurality of users would enjoy the first media content.

15. The system of claim 11, wherein the control circuitry is further configured to:

compare properties of the first media content with preferences associated with the plurality of users; and provide the reminder only when the properties of the first media content do not conflict with the preferences associated with the plurality of users.

16. The system of claim 11, wherein the control circuitry is further configured to:

provide an option to access the first media content on a different media device associated with at least one of the first user and the second user.

17. The system of claim 11, wherein the control circuitry is further configured to:

provide an option to access the first media content on a different media device, wherein at least one of the plurality of users is detected within a detectable range relative to the different media device, but outside of a different detection region that is associated with the different media device.

18. The system of claim 11, wherein the reminder is only provided when the first user and the second user are associated with an appropriate group.

19. The system of claim 11, wherein the reminder was previously set by at least one of the first user and the second user.

20. The system of claim 11, wherein the reminder was automatically set by a service provider upon a determination of a probability that at least one of the first user and the second user would be interested in the first media content.

* * * * *